United States Patent
Li

(10) Patent No.: US 10,872,622 B1
(45) Date of Patent: Dec. 22, 2020

(54) METHOD AND SYSTEM FOR DEPLOYING MIXED STORAGE PRODUCTS ON A UNIFORM STORAGE INFRASTRUCTURE

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/795,410

(22) Filed: Feb. 19, 2020

(51) Int. Cl.
  *G11B 5/004* (2006.01)
  *G11B 5/00* (2006.01)
  *G11B 5/09* (2006.01)
  *G11B 20/18* (2006.01)

(52) U.S. Cl.
  CPC ............ *G11B 5/09* (2013.01); *G11B 20/1833* (2013.01)

(58) Field of Classification Search
  CPC .. G11B 5/00; G11B 5/09; G11B 5/012; G11B 11/10516; G11B 11/10515; G11B 11/10521; G11B 11/10595; G11B 2005/0021; G11B 27/36; G11B 20/1009; G11B 20/12; G11B 20/18; G11B 2020/183; G11B 5/004
  USPC .................................. 360/25, 31, 48, 53, 54
  See application file for complete search history.

(56) References Cited

U.S. PATENT DOCUMENTS

| | | | |
|---|---|---|---|
| 4,775,932 A | 10/1988 | Oxley | |
| 5,930,167 A | 7/1999 | Lee | |
| 6,148,377 A | 11/2000 | Carter | |
| 6,226,650 B1 | 5/2001 | Mahajan et al. | |
| 6,243,795 B1 | 6/2001 | Yang | |
| 7,565,454 B2 | 7/2009 | Zuberi | |
| 7,958,433 B1 | 6/2011 | Yoon | |
| 8,085,569 B2 | 12/2011 | Kim | |

(Continued)

FOREIGN PATENT DOCUMENTS

| JP | 2003022209 | 1/2003 |
|---|---|---|
| JP | 2011175422 | 9/2011 |

(Continued)

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

(Continued)

*Primary Examiner* — Nabil Z Hindi
(74) *Attorney, Agent, or Firm* — Shun Yao; Park, Vaughan, Fleming & Dowler LLP

(57) ABSTRACT

A system is provided to receive a first request to write data to a hard disk drive (HDD) which comprises a plurality of tracks which can be configured as a conventional magnetic recording (CMR) media or as a shingled magnetic recording (SMR) media, wherein an SMR-configured track stores a greater amount of data than a CMR-configured track. The system writes the data to a first CMR-configured track, and classifies data stored in CMR-configured tracks as hot or cold based on a first or a second predetermined threshold. The system copies cold data from the CMR-configured tracks to an SMR zone, and makes available portions of the CMR-configured tracks previously occupied by the cold data.

20 Claims, 12 Drawing Sheets

(56) References Cited

U.S. PATENT DOCUMENTS

| | | |
|---|---|---|
| 8,144,512 B2 | 3/2012 | Huang |
| 8,166,233 B2 | 4/2012 | Schibilla |
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,751,763 B1 | 6/2014 | Ramarao |
| 8,825,937 B2 | 9/2014 | Atkisson |
| 8,949,208 B1 | 2/2015 | Xu |
| 9,043,545 B2 | 5/2015 | Kimmel |
| 9,088,300 B1 | 7/2015 | Chen |
| 9,092,223 B1 | 7/2015 | Pani |
| 9,280,472 B1 | 3/2016 | Dang |
| 9,280,487 B2 | 3/2016 | Candelaria |
| 9,529,601 B1 | 12/2016 | Dharmadhikari |
| 9,588,698 B1 | 3/2017 | Karamcheti |
| 9,588,977 B1 | 3/2017 | Wang |
| 9,607,631 B2 * | 3/2017 | Rausch ............. G11B 20/1889 |
| 10,013,169 B2 | 7/2018 | Fisher |
| 10,229,735 B1 | 3/2019 | Natarajan |
| 10,235,198 B2 | 3/2019 | Qiu |
| 2002/0010783 A1 | 1/2002 | Primak |
| 2002/0073358 A1 | 6/2002 | Atkinson |
| 2002/0161890 A1 | 10/2002 | Chen |
| 2003/0074319 A1 | 4/2003 | Jaquette |
| 2003/0163594 A1 | 8/2003 | Aasheim |
| 2003/0163633 A1 | 8/2003 | Aasheim |
| 2004/0010545 A1 | 1/2004 | Pandya |
| 2004/0143718 A1 | 7/2004 | Chen |
| 2004/0255171 A1 | 12/2004 | Zimmer |
| 2004/0268278 A1 | 12/2004 | Hoberman |
| 2005/0038954 A1 | 2/2005 | Saliba |
| 2005/0097126 A1 | 5/2005 | Cabrera |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0156012 A1 | 7/2006 | Beeson |
| 2007/0033323 A1 | 2/2007 | Gorobets |
| 2007/0061502 A1 | 3/2007 | Lasser |
| 2007/0101096 A1 | 5/2007 | Gorobets |
| 2007/0283081 A1 | 12/2007 | Lasser |
| 2007/0285980 A1 | 12/2007 | Shimizu |
| 2008/0034154 A1 | 2/2008 | Lee |
| 2008/0112238 A1 | 5/2008 | Kim |
| 2008/0301532 A1 | 12/2008 | Uchikawa |
| 2009/0113219 A1 | 4/2009 | Aharonov |
| 2009/0282275 A1 | 11/2009 | Yermalayeu |
| 2009/0307249 A1 | 12/2009 | Koifman |
| 2009/0310412 A1 | 12/2009 | Jang |
| 2010/0031000 A1 | 2/2010 | Flynn |
| 2010/0169470 A1 | 7/2010 | Takashige |
| 2010/0229224 A1 | 9/2010 | Etchegoyen |
| 2010/0241848 A1 | 9/2010 | Smith |
| 2010/0321999 A1 | 12/2010 | Yoo |
| 2010/0325367 A1 | 12/2010 | Kornegay |
| 2011/0055458 A1 | 3/2011 | Kuehne |
| 2011/0055471 A1 | 3/2011 | Thatcher |
| 2011/0072204 A1 | 3/2011 | Chang |
| 2011/0099418 A1 | 4/2011 | Chen |
| 2011/0153903 A1 | 6/2011 | Hinkle |
| 2011/0161784 A1 | 6/2011 | Selinger |
| 2011/0218969 A1 | 9/2011 | Anglin |
| 2011/0231598 A1 | 9/2011 | Hatsuda |
| 2011/0292538 A1 | 12/2011 | Haga |
| 2011/0299317 A1 | 12/2011 | Shaeffer |
| 2011/0302353 A1 | 12/2011 | Confalonieri |
| 2012/0039117 A1 | 2/2012 | Webb |
| 2012/0084523 A1 | 4/2012 | Littlefield |
| 2012/0117399 A1 | 5/2012 | Chan |
| 2012/0147021 A1 | 6/2012 | Cheng |
| 2012/0159289 A1 | 6/2012 | Piccirillo |
| 2012/0210095 A1 | 8/2012 | Nellans |
| 2012/0233523 A1 | 9/2012 | Krishnamoorthy |
| 2012/0246392 A1 | 9/2012 | Cheon |
| 2012/0278579 A1 | 11/2012 | Goss |
| 2012/0284587 A1 | 11/2012 | Yu |
| 2013/0013880 A1 | 1/2013 | Tashiro |
| 2013/0061029 A1 | 3/2013 | Huff |
| 2013/0073798 A1 | 3/2013 | Kang |
| 2013/0080391 A1 | 3/2013 | Raichstein |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0159723 A1 | 6/2013 | Brandt |
| 2013/0166820 A1 | 6/2013 | Batwara |
| 2013/0173845 A1 | 7/2013 | Aslam |
| 2013/0219131 A1 | 8/2013 | Alexandron |
| 2013/0318283 A1 | 11/2013 | Small |
| 2013/0318395 A1 | 11/2013 | Kalavade |
| 2014/0082273 A1 | 3/2014 | Segev |
| 2014/0108414 A1 | 4/2014 | Stillerman |
| 2014/0181532 A1 | 6/2014 | Camp |
| 2014/0233950 A1 | 8/2014 | Luo |
| 2014/0250259 A1 | 9/2014 | Ke |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0142752 A1 | 5/2015 | Chennamsetty |
| 2015/0227316 A1 | 8/2015 | Warfield |
| 2015/0277937 A1 | 10/2015 | Swanson |
| 2015/0301964 A1 | 10/2015 | Brinicombe |
| 2015/0304108 A1 | 10/2015 | Obukhov |
| 2015/0363271 A1 | 12/2015 | Haustein |
| 2015/0372597 A1 | 12/2015 | Luo |
| 2016/0014039 A1 | 1/2016 | Reddy |
| 2016/0098344 A1 | 4/2016 | Gorobets |
| 2016/0110254 A1 | 4/2016 | Cronie |
| 2016/0179399 A1 | 6/2016 | Melik-Martirosian |
| 2016/0188223 A1 | 6/2016 | Camp |
| 2016/0188890 A1 | 6/2016 | Naeimi |
| 2016/0232103 A1 | 8/2016 | Schmisseur |
| 2016/0239074 A1 | 8/2016 | Lee |
| 2016/0239380 A1 | 8/2016 | Wideman |
| 2016/0274636 A1 | 9/2016 | Kim |
| 2016/0306853 A1 | 10/2016 | Sabaa |
| 2016/0343429 A1 | 11/2016 | Nieuwejaar |
| 2016/0350002 A1 | 12/2016 | Vergis |
| 2017/0075583 A1 | 3/2017 | Alexander |
| 2017/0075594 A1 | 3/2017 | Badam |
| 2017/0109232 A1 | 4/2017 | Cha |
| 2017/0147499 A1 | 5/2017 | Mohan |
| 2017/0162235 A1 | 6/2017 | De |
| 2017/0168986 A1 | 6/2017 | Sajeepa |
| 2017/0212708 A1 | 7/2017 | Suhas |
| 2017/0228157 A1 | 8/2017 | Yang |
| 2017/0249162 A1 | 8/2017 | Tsirkin |
| 2017/0262176 A1 | 9/2017 | Kanno |
| 2017/0262178 A1 | 9/2017 | Hashimoto |
| 2017/0285976 A1 | 10/2017 | Durham |
| 2017/0286311 A1 | 10/2017 | Juenemann |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0088867 A1 | 3/2018 | Kaminaga |
| 2018/0107591 A1 | 4/2018 | Smith |
| 2018/0143780 A1 | 5/2018 | Cho |
| 2018/0150640 A1 | 5/2018 | Li |
| 2018/0167268 A1 | 6/2018 | Liguori |
| 2018/0189182 A1 | 7/2018 | Wang |
| 2018/0270110 A1 | 9/2018 | Chugtu |
| 2018/0293014 A1 | 10/2018 | Ravimohan |
| 2018/0329776 A1 | 11/2018 | Lai |
| 2018/0349396 A1 | 12/2018 | Blagojevic |
| 2018/0373428 A1 | 12/2018 | Kan |

(56) References Cited

U.S. PATENT DOCUMENTS

| | | |
|---|---|---|
| 2019/0012111 A1 | 1/2019 | Li |
| 2019/0073262 A1 | 3/2019 | Chen |
| 2019/0205206 A1 | 7/2019 | Hornung |

FOREIGN PATENT DOCUMENTS

| | | |
|---|---|---|
| WO | 9418634 | 8/1994 |
| WO | 1994018634 | 8/1994 |

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

EMC Powerpath Load Balancing and Failover Comparison with native MPIO operating system solutions. Feb. 2011.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices"< FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

\* cited by examiner

METHOD AND SYSTEM FOR DEPLOYING MIXED STORAGE PRODUCTS ON A UNIFORM STORAGE INFRASTRUCTURE

BACKGROUND

Field

This disclosure is generally related to the field of data storage. More specifically, this disclosure is related to a method and system for deploying mixed storage products on a uniform storage infrastructure.

Related Art

Today, various storage systems are being used to store and access the ever-increasing amount of digital content. A storage system can include storage servers with one or more storage devices or drives, and a storage device or drive can include storage media with a non-volatile memory (such as a solid state drive (SSD) or a hard disk drive (HDD)). A cloud provider may provide storage services to customers with widely varying requirements. For example, the cloud provider may design storage products for varying I/O performance requirements and costs. In order to support these varying storage products, diversified hardware infrastructures may need to be manufactured in order to achieve a particular locally optimized performance for a particular software product. As the existing scale of storage systems continues to grow, challenges remain in coordinating the development of the storage system infrastructure with the current and projected plan of device manufacturers (e.g., HDD manufacturers). In addition, improving the performance and reducing the cost can also present challenges in the research and development of the storage system infrastructure.

One current storage system infrastructure involves cloud products which can support both a warm storage and archival storage, where each type of storage product maintains and uses it own individual cluster. For example, a warm storage product can include its own individual clusters and server configuration, using conventional magnetic recording (CMR) HDDs and a write cache to ensure a certain I/O performance. An archival storage product can also include its own individual clusters and server configuration, using a CMR HDD as a write cache and high-density just a bunch of disks (JBODs) with SMR HDDs. However, this current storage system infrastructure is constrained by several factors: diversified products require multiple different hardware and software configurations, which limit the growth and increase the complexity; individual clusters maintain individual watermarks, which can increase the cost of the reserved capacity; and the increasing capacity of HDDs may be limited by the mechanical characteristics of HDDs, which can limit the throughput of the higher capacity HDDs.

Thus, providing a storage system infrastructure which can efficiently support varying storage products remains a challenge.

SUMMARY

One embodiment provides a system which facilitates operation of a storage system. During operation, the system receives a first request to write data to a hard disk drive (HDD) which comprises a plurality of tracks which can be configured as a conventional magnetic recording (CMR) media or as a shingled magnetic recording (SMR) media, wherein an SMR-configured track stores a greater amount of data than a CMR-configured track. The system writes the data to a first CMR-configured track, and classifies data stored in CMR-configured tracks as hot or cold, wherein a hot classification indicates an access frequency greater than a first predetermined threshold, and wherein a cold classification indicates an access frequency less than a second predetermined threshold. The system copies cold data from the CMR-configured tracks to a zone associated with SMR-configured tracks, and makes available portions of the CMR-configured tracks previously occupied by the cold data.

In some embodiments, the system detects a condition to recycle the first CMR-configured track. The system copies hot data from the first CMR-configured track to a volatile memory, and writes the hot data from the volatile memory to a second CMR-configured track by overwriting a next available portion of the second CMR-configured track. The system makes available an entirety of the first CMR-configured track.

In some embodiments, copying the cold data from the CMR-configured tracks to the zone associated with the SMR-configured tracks comprises sequentially appending the cold data to a next available portion of the zone.

In some embodiments, the system classifies the data stored in the CMR-configured tracks as warm, wherein a warm classification indicates an access frequency less than the first predetermined threshold and greater than the second predetermined threshold. In response to detecting the condition to recycle the first CMR-configured track: the system copies the warm data from the first CMR-configured track to the volatile memory; and subsequent to writing the hot data from the volatile memory to the second CMR-configured track, the system writes the warm data from the volatile memory to the second CMR-configured track or a third CMR-configured track with available space by overwriting the next available portion of the second or the third CMR-configured track.

In some embodiments, prior to writing the data to the first CMR-configured track, the system performs the following operations. In response to determining that the data cannot be successfully committed in time to meet a predetermined throughput requirement, the system sequentially writes the data into a persistent journal, and writes the data from the persistent journal to the first or another CMR-configured track. In response to determining that the data can be successfully committed in time to meet the predetermined throughput requirement, the system writes the data to the first CMR-configured track.

In some embodiments, the cold data stored in the CMR-configured tracks is encoded based on a first erasure code (EC) and a first parity check matrix, the first parity check matrix includes a user matrix portion and a parity matrix portion, a first codeword stored as cold data in the CMR-configured tracks comprises a first user portion and a first EC parity, and a second codeword stored as cold data in the CMR-configured tracks comprises a second user portion and a second EC parity. Copying cold data from the CMR-configured tracks to the zone associated with the SMR-configured tracks comprises: concatenating the first user portion and the second user portion to form a new user portion; generating a new parity for the concatenated new user portion by performing a bitwise exclusive-OR operation on the first EC parity and the second EC parity; and writing a new codeword to the zone associated with the SMR-configured tracks, wherein the new codeword comprises the new user portion and the new parity, thereby avoiding a first decoding of the first user portion, a second decoding of the second user portion, and a third encoding of the first user portion and the second user portion.

In some embodiments, the new codeword is encoded based on a new parity check matrix which comprises a first copy of the user matrix portion, a second copy of the user matrix portion, and the parity matrix portion.

In some embodiments, a distributed storage system comprises a plurality of storage clusters, a respective storage cluster does not include any reserved capacity and does include a plurality of control servers and a plurality of Ethernet just a bunch of disks (E-JBODs). A control server includes a persistent journal and a first number of hard disk drives with tracks configurable as CMR or SMR media, and an E-JBOD includes a custom network interface card (NIC) and a plurality of HDD groups. An HDD group comprises a plurality of hard disk drives (HDDs) with tracks configurable as CMR or SMR media, and a total number of HDDs of the E-JBOD is greater than the first number of HDDs in the control server.

In some embodiments, the system detects a condition which requires adding an additional control server or an additional E-JBOD to the respective storage cluster. The system extends resources within the respective storage cluster by deploying the additional control server or the additional E-JBOD in the respective storage cluster. The system detects a condition which requires adding an additional storage cluster to the distributed storage system. The system extends resources within the distributed storage system by adding the additional storage cluster to the distributed storage system.

The system receives a second request to read data from the hard disk drive (HDD). The system performs a search in a data structure based on a logical address for the requested data to obtain a corresponding physical address. The system reads the requested data from the HDD based on the obtained physical address.

In some embodiments, prior to writing the data to the first CMR-configured track, the system performs the following operations. The system determines whether the data of the first request is new data or an update to existing data. In response to determining that the data is new data, the system writes the new data to the first CMR-configured track at a first physical address, and creates an entry in a data structure which maps a logical address of the data to the first physical address. In response to determining that the data is updated data, the system performs a search in the data structure based on the logical address of the data to obtain a second physical address, and writes the updated data to a CMR-configured track at the second physical address.

BRIEF DESCRIPTION OF THE FIGURES

In the figures, like reference numerals refer to the same figure elements.

DETAILED DESCRIPTION

Figure 1:
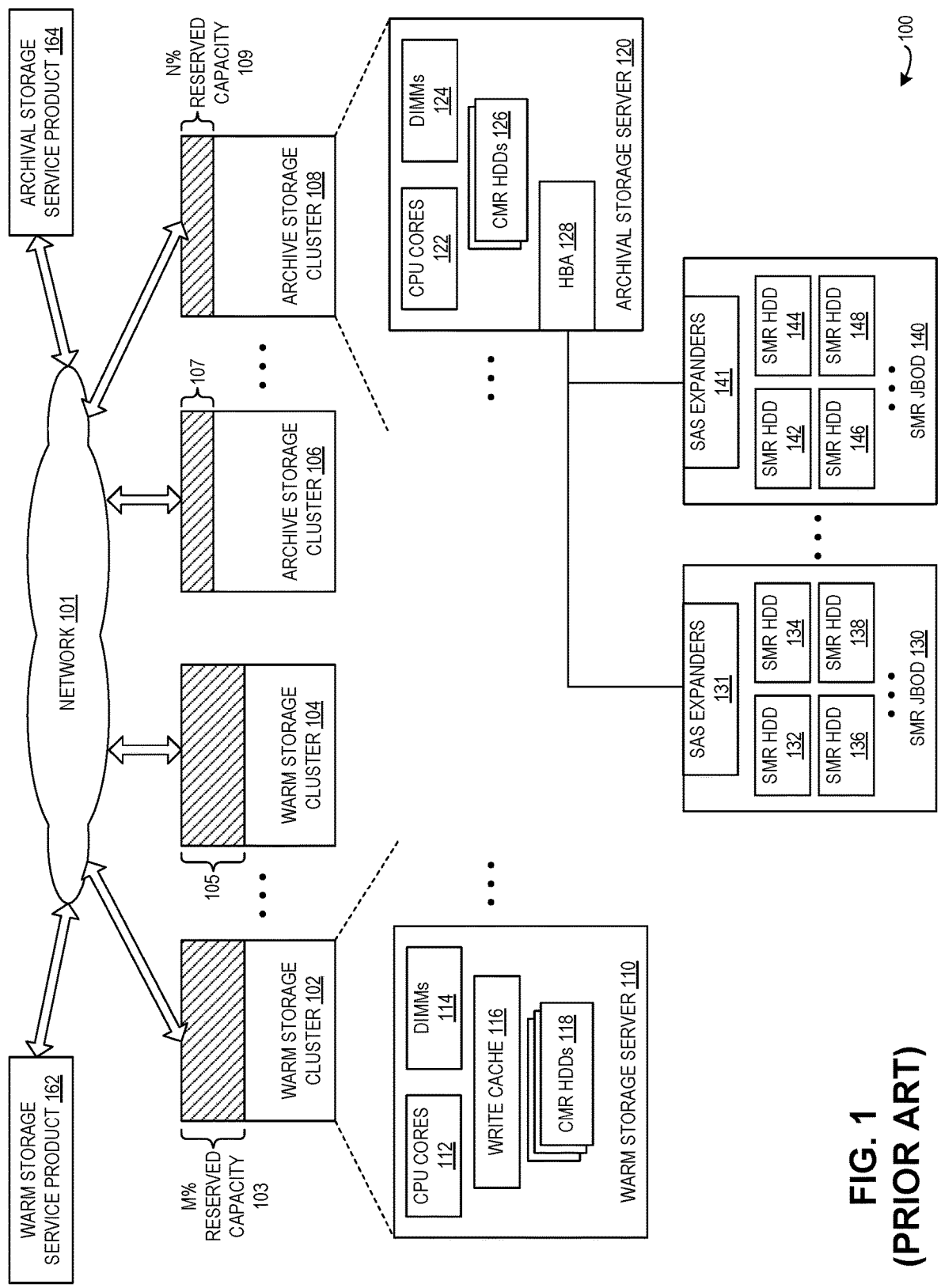
FIG. 1 illustrates an exemplary environment which facilitates operation of a storage system, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein facilitate a system for deployment of mixed storage products on a uniform storage infrastructure, by using a "hybrid" hard disk drive (HDD) with tracks which can be configured as either conventional magnetic recording (CMR) media or as shingled magnetic recording (SMR) media.

As described above, current storage system infrastructures may involve supporting different types of storage products, which may be associated with different costs and I/O performance requirements. As the scale of storage systems continues to grow, challenges remain in coordinating storage system infrastructure development with storage device development (e.g., the current and projected plans of HDD manufacturers). One current storage system infrastructure can support both warm storage products (e.g., storage of data considered "hot" based on access frequency) and archival storage products (e.g., storage of data be considered "cold" based on access frequency), where each storage product type maintains and uses its own individual cluster. However, this current storage system infrastructure can be limited by several factors: diversified products require multiple different hardware and software configurations, which limit the growth and increase the complexity; individual clusters maintain individual watermarks, which can increase the cost of the reserved capacity; and the increasing capacity of HDDs may be limited by the mechanical characteristics of HDDs, which can limit the throughput of the higher capacity HDDs. An exemplary current storage system infrastructure is described below in relation to FIG. 1.

The embodiments described herein address these limitations by providing a uniform storage system infrastructure, which is based on using hybrid HDDs with tracks which can be configured as either CMR or SMR media. In general, SMR media can store a greater amount of data than CMR media, due to the overlapping shingled structure of the physical SMR media. The system can initially write data to CMR-configured tracks, classify the written data based on "hotness" or access frequency (e.g., hot, warm, or cold), and convert certain CMR-configured tracks to SMR-configured tracks (e.g., in an SMR zone) in order to improve the efficiency of the capacity of the HDD. The conversion process involves identifying a CMR-configured track to be converted or recycled, moving cold data from the identified CMR-configured track to an SMR-configured track or zone, compacting data by moving hot or warm data from the identified CMR-configured track to available portions of other CMR-configured tracks.

Thus, based on these conversion and compaction processes, the system can use the configurable tracks to dynamically adjust the ratio of support for different storage products on a single storage system infrastructure, which can ensure that the actual I/O capability of the HDDs can provide the I/O performance required under different service level agreements (SLAs) for different storage products. This dynamic adjustment can result in an improved and more efficient overall storage system when deploying mixed storage products on a single (uniform) storage infrastructure.

Figure 2:
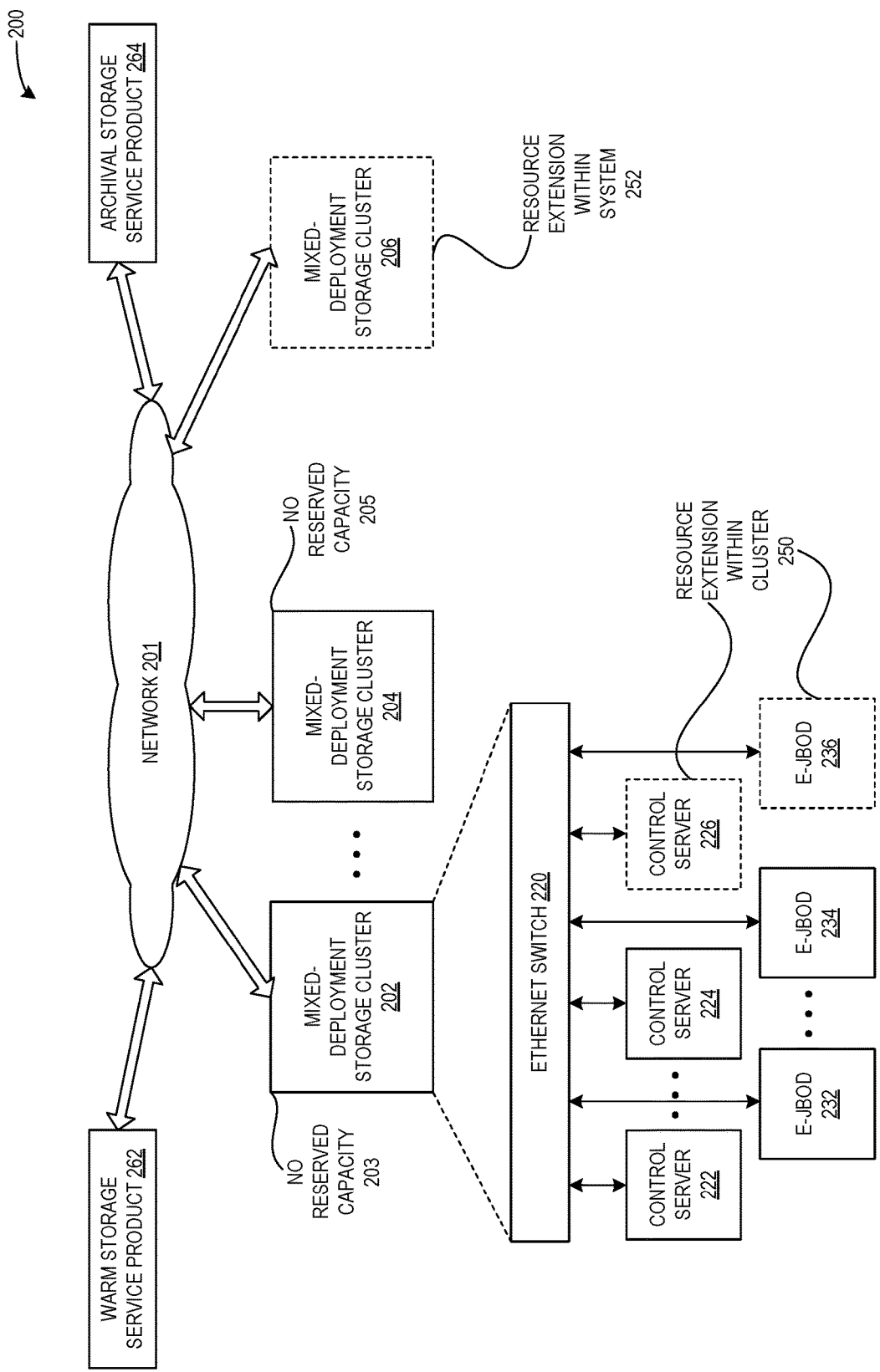
FIG. 2 illustrates an exemplary environment of a storage infrastructure to support multiple storage products, in accordance with an embodiment of the present application.

An exemplary storage system infrastructure which supports different storage products is described below in relation to FIG. 2, and an exemplary conversion process in a hybrid HDD is described below in relation to FIGS. 5A-5C. Furthermore, when moving data from certain CMR-configured tracks to the SMR-configured tracks, the system can perform an erasure code (EC) conversion which eliminates the consumption of time and resources typically required to perform two EC decodings and one EC encoding for each data move, as described below in relation to FIG. 4.

A "storage system infrastructure," "storage infrastructure," or "storage system" refers to the overall set of hardware and software components used to facilitate storage for a system. A storage system can include multiple clusters of storage servers and other servers. A "storage server" refers to a computing device which can include multiple storage devices or storage drives. A "storage device" or a "storage drive" refers to a device or a drive with a non-volatile memory which can provide persistent storage of data, e.g., a solid state drive (SSD), a hard disk drive (HDD), or a flash-based storage device. In this disclosure, a "hybrid hard disk drive" or "hybrid HDD" refers to a hard disk drive with tracks configurable as CMR or SMR media.

A "computing device" refers to any server, device, node, entity, drive, or any other entity which can provide any computing capabilities.

A "control server" refers to a computing device which can include a flash translation layer (FTL) module for handling mapping of logical addresses to physical addresses. In this disclosure, a control server can communicate with other computing devices via an Ethernet switch. An exemplary control server is described below in relation to FIG. 3A.

An "Ethernet just a bunch of disks" or "E-JBOD" refers to a computing device with a plurality of HDD groups, where an HDD group can include a plurality of hard disk drives with tracks configurable as CMR or SMR media (i.e., hybrid HDDs). In this disclosure, an E-JBOD can communicate with other computing devices (e.g., a control server) via an Ethernet switch. An exemplary E-JBOD is described below in relation to FIG. 3B.

The term "hard disk drive system" refers to a system which can store data on at least a hard disk drive.

The term "CMR track" or "CMR-configured track" refers to a track in a hard disk drive, wherein the track is configured to persistently store data using a conventional magnetic recording (CMR) media. A CMR track can support both sequential writes and in-place overwrites.

The term "SMR track" or "SMR-configured track" refers to a track in a hard disk drive, wherein the track is configured to persistently store data using a shingled magnetic recording (SMR) media. An SMR track can support sequential writes, e.g., by appending data to a next available portion of the SMR track. The term "SMR zone" refers to a group or region associated with a plurality of SMR-configured tracks. During a conversion or recycling process (as described below in relation to FIGS. 5A-5C, the system can move data from a CMR-configured track to a newly assigned or created SMR zone (or to the SMR-configured tracks of the newly assigned or created SMR zone).

Exemplary Operation of a Storage System in the Prior Art

One current storage system infrastructure can support both warm storage products (e.g., storage of data considered "hot" based on access frequency) and archival storage products (e.g., storage of data considered "cold" based on access frequency), where each storage product type maintains and uses its own individual cluster. FIG. 1 illustrates an exemplary environment 100 which facilitates operation of a storage system, in accordance with the prior art.

Environment 100 can include a network 101, via which a cloud provider (not shown) can provide services and support for a warm storage service product 162 and an archival storage service product 164. Environment 100 can also include a storage system infrastructure, which can include warm storage clusters (e.g., warm storage clusters 102 and 104) and archive storage clusters (e.g., archive storage clusters 106 and 108). Each type of storage cluster can include specific servers configured for the specific storage type. For example, warm storage cluster 102 can include at least a warm storage server 110, which can include: CPU cores 112; dual in-line memory modules (DIMMs) 114; a write cache 116; and CMR HDDs 118. Archival storage cluster 108 can include at least an archival storage server 120, which can include: CPU cores 122; DIMMs 124; CMR HDDs 126 (used as a write cache); and a host bus adaptor (HBA) 128. HBA 128 can be coupled to a plurality of SMR JBODs, including SMR JBODs 130 and 140. An SMR JBOD can include a plurality of SMR HDDs. For example, SMR JBOD 130 can include Serial-Attached SCSI (Small Computer System Interface) (SAS) expanders 131 and SMR HDDs 132, 134, 136, and 138. Similarly, SMR JBOD 140 can include SAS expanders 141 and SMR HDDs 142, 144, 146, and 148.

The conventional storage system infrastructure of FIG. 1 can be limited by several factors. First, the different storage product types require multiple different hardware and software systems, including configuration of each specific server, the specific version of a particular firmware or driver, and a specific version or configuration of a specific distributed storage system. As the infrastructure grows, these multiple systems may result in an increase in complexity, which can increase the cost involved to operate and maintain the storage system infrastructure. For example, a system upgrade may require a significant investment in both workload and investment, as multiple different hardware and software systems may be involved in such an upgrade.

Second, each individual storage cluster must maintain its own "watermark" or percentage of reserved capacity. For example: warm storage cluster 102 may be configured with a watermark which indicates M % of reserved capacity 103; warm storage cluster 104 may be configured with a watermark which indicates a reserved capacity 105; archival storage cluster 108 may be configured with a watermark which indicates N % of reserved capacity 109; and archival storage cluster 106 may be configured with a watermark which indicates a reserved capacity 107. The usage of this reserved capacity cannot be efficiently predicted, and may result in only a small fraction of the reserved capacity being used. As an increasing number of individual cluster and servers are deployed to meet the increasing number of deployed storage products (and storage product types), the reserved capacity may result in a high cost, especially when only a small fraction of the reserved capacity may be needed or used.

Third, the increasing capacity of HDDs may be limited by the mechanical characteristics of HDDs (e.g., read/write heads moving to a desired location on a track of a platter of an HDD) and the speed of the rotation of the platters (e.g., rounds per minute or RPM). However, as manufacturers continue to develop these higher-capacity HDDs, the input/output per second (TOPS) per Terabyte (TB) on a single HDD can be a crucial factor. Despite the continuing increasing in the storage capacity of HDDs, the overall throughput may not increase at a similar pace. The dilemma of cost, capacity, and throughput remains a challenge in the evolution of these higher-density storage products.

Fourth, the failure of a single high-capacity HDD can result in a data recovery process on the order of several hours, due to the large amount of data on the failed high-capacity HDD. This amount of offline time may impact both the performance of the overall storage system and the availability of the data stored on the failed drive, especially if the data is not available through another source.

Thus, all of these constraints can limit the flexibility and performance of the overall storage system infrastructure.

Exemplary Storage Infrastructure to Support Multiple Storage Products

The embodiments described herein address these above-described constraints by providing a system which facilitates deployment of mixed storage products on a uniform storage infrastructure. The system uses hybrid HDDs, with tracks which can be dynamically configured as CMR or SMR media. FIG. 2 illustrates an exemplary environment 200 of a storage infrastructure to support multiple storage products, in accordance with an embodiment of the present application. Environment 200 can include a network 201, via which a cloud provider (not shown) can provide services and support for a warm storage service product 262 and an archival storage service product 264, via a uniform storage system infrastructure. Instead of the individual storage system clusters arranged by storage product type in the conventional infrastructure of environment 100, this uniform storage infrastructure of environment 200 can include multiple mixed-deployment storage clusters (e.g., at least 202 and 204).

A mixed-deployment storage cluster can include multiple control servers and multiple Ethernet JBODs (E-JBODs). No amount of reserved capacity is included in a given storage cluster, as one or more additional control servers or E-JBODs can be easily added as a resource extension within the given storage cluster. For example, mixed-deployment storage cluster 202 can include at least control servers 222 and 224 and at least E-JBODs 232-234, which can communicate with each other via an Ethernet switch 220. Control servers 222 and 224 and E-JBODs 232 and 234 can include hybrid HDDs, with tracks which can be configured as CMR or SMR media, as described below in relation to FIGS. 3A-3B and 5A-5C.

Mixed-deployment storage cluster 202 can also include a no reserved capacity 203. If the system detects a condition which requires adding an additional control server or E-JBOD to cluster 202, the system can easily extend the resources within storage cluster 202 by deploying the additional control server or E-JBOD in cluster 202 (e.g., a control server 226 or an E-JBOD 236) as a resource extension within cluster 250. The system can also detect a condition which requires adding an additional storage cluster to the overall storage system infrastructure (e.g., a distributed storage system as depicted in environment 200). The system can extend the resources within the distributed storage system by adding an additional mixed-deployment storage cluster (e.g., a cluster 206) as a resource extension within system 252. Thus, the system can dynamically adjust the ratio of control servers to E-JBODs as needed, e.g., based on achieving an optimal balance between computational and management functions and storage capacity.

Moreover, the system can mitigate the impact of the failure of a single HDD, as compared to the significant amount of offline time involved with a single failed high-capacity HDD in the conventional system. Because the described embodiments can combine the data from multiple storage products in a single drive (i.e., by using a uniform storage system infrastructure based on the hybrid HDD), the amount of hot or warm data stored on a single hybrid HDD may be limited to a particular amount, which can make the data recovery process of data on the single failed hybrid HDD tolerable. In the meantime, the amount of cold data stored on the single failed hybrid HDD may be associated with more relaxed data recovery requirements (e.g., a service level agreement (SLA) with lower requirements than an SLA for the hot or warm data), which does not adversely affect any data recovery process that would need to be performed on the single failed hybrid HDD.

Exemplary Control Server and Ethernet JBOD

Figure 3B:
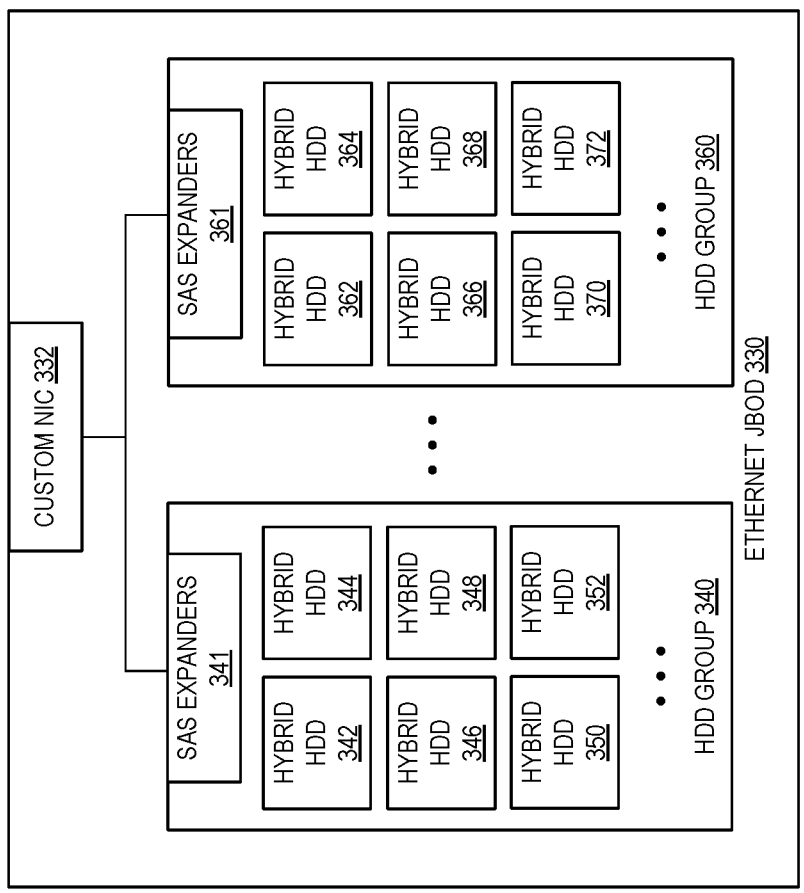
FIG. 3B illustrates an exemplary Ethernet just a bunch of disks (E-JBOD), in accordance with an embodiment of the present application.
Figure 3A:
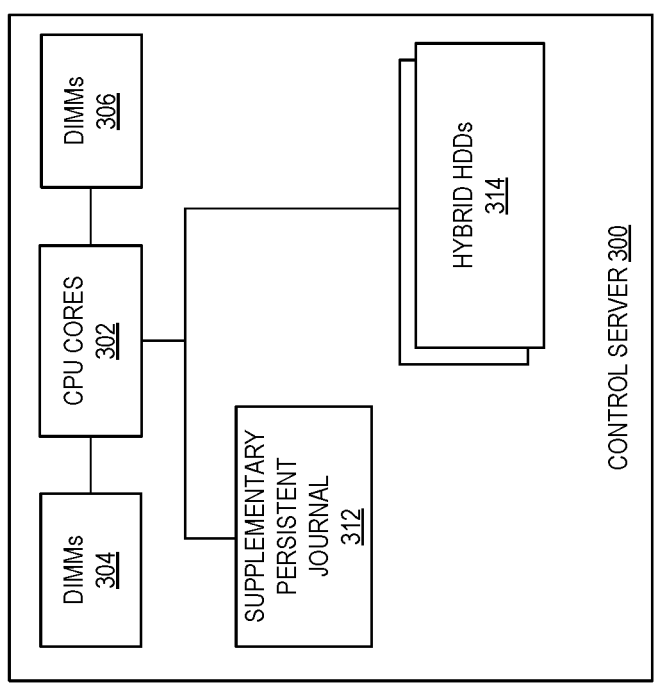
FIG. 3A illustrates an exemplary control server, in accordance with an embodiment of the present application.

FIG. 3A illustrates an exemplary control server 300, in accordance with an embodiment of the present application. Control server 300 can include: CPU cores 302; DIMMs 304; DIMMs 306; a supplementary persistent journal 312; and hybrid HDDs 314. The number of hybrid HDDs 314 can be a small number, as compared to the hundreds of hybrid HDDs depicted below in the E-JBOD of FIG. 3B.

FIG. 3B illustrates an exemplary Ethernet just a bunch of disks (E-JBOD) 330, in accordance with an embodiment of the present application. E-JBOD can include a customer network interface card (NIC) 332 and a plurality of HDD groups (e.g., 340 and 360). Each HDD group can include SAS expanders and a plurality of hybrid HDDs. For example: HDD group 340 can include SAS expanders 341 and hybrid HDDs 342, 344, 346, 348, 350, and 352; and HDD group 360 can include SAS expanders 361 and hybrid HDDs 362, 364, 366, 368, 370, and 372. Custom NIC 332 can execute the protocol exchange between Ethernet and SAS. Ethernet JBOD 330 can include hundreds of hybrid HDDs, or a number of hybrid HDDs which is much greater than the number of hybrid HDDs in control server 300. The hybrid HDDs of E-JBOD 330 can be divided into HDD groups based on various reasons, including power saving and data recovery.

If the hybrid HDDs in either control server 300 or E-JBOD 330 cannot provide sufficient I/O performance (i.e., if the system determines that data to be written cannot be successfully written/committed in time to meet a predetermined threshold), the system can write the data to supplementary persistent journal 312 of control server 300. This can reduce the write latency and assure meeting the I/O performance required by any service level agreements (SLAs). The system can subsequently write the data from the persistent journal to the hybrid HDDs in the manner described below in relation to FIGS. 5A-5C.

Exemplary Data Placement in a Hybrid Hard Disk Drive

Figure 5A:
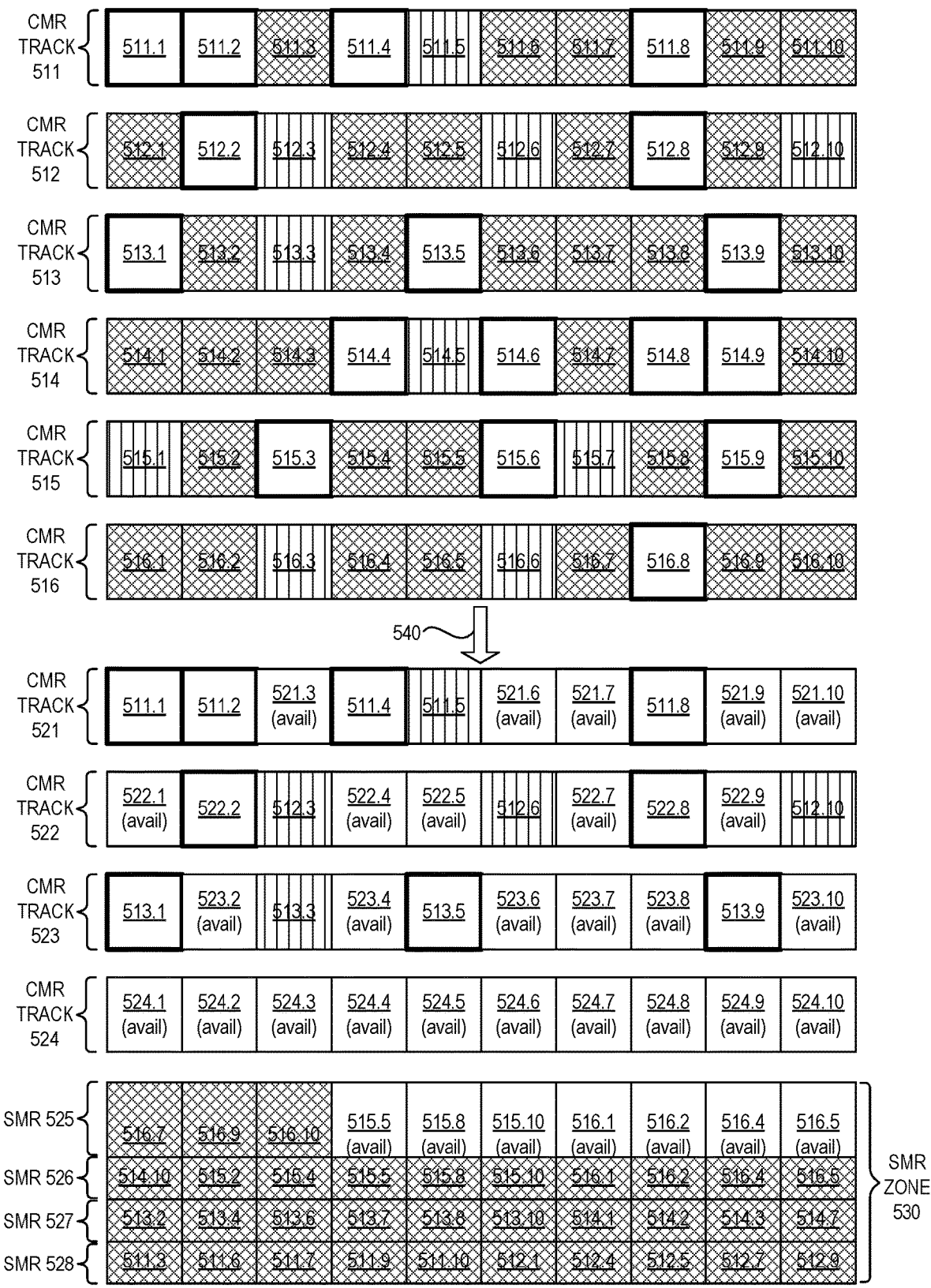
FIGS. 5A, 5B, and 5C illustrate an exemplary data placement in a hybrid HDD, including placement and classification of data, conversion of CMR-configured tracks to an SMR-configured zone, and recycling of CMR-configured tracks, in accordance with an embodiment of the present application.
Figure 5B:
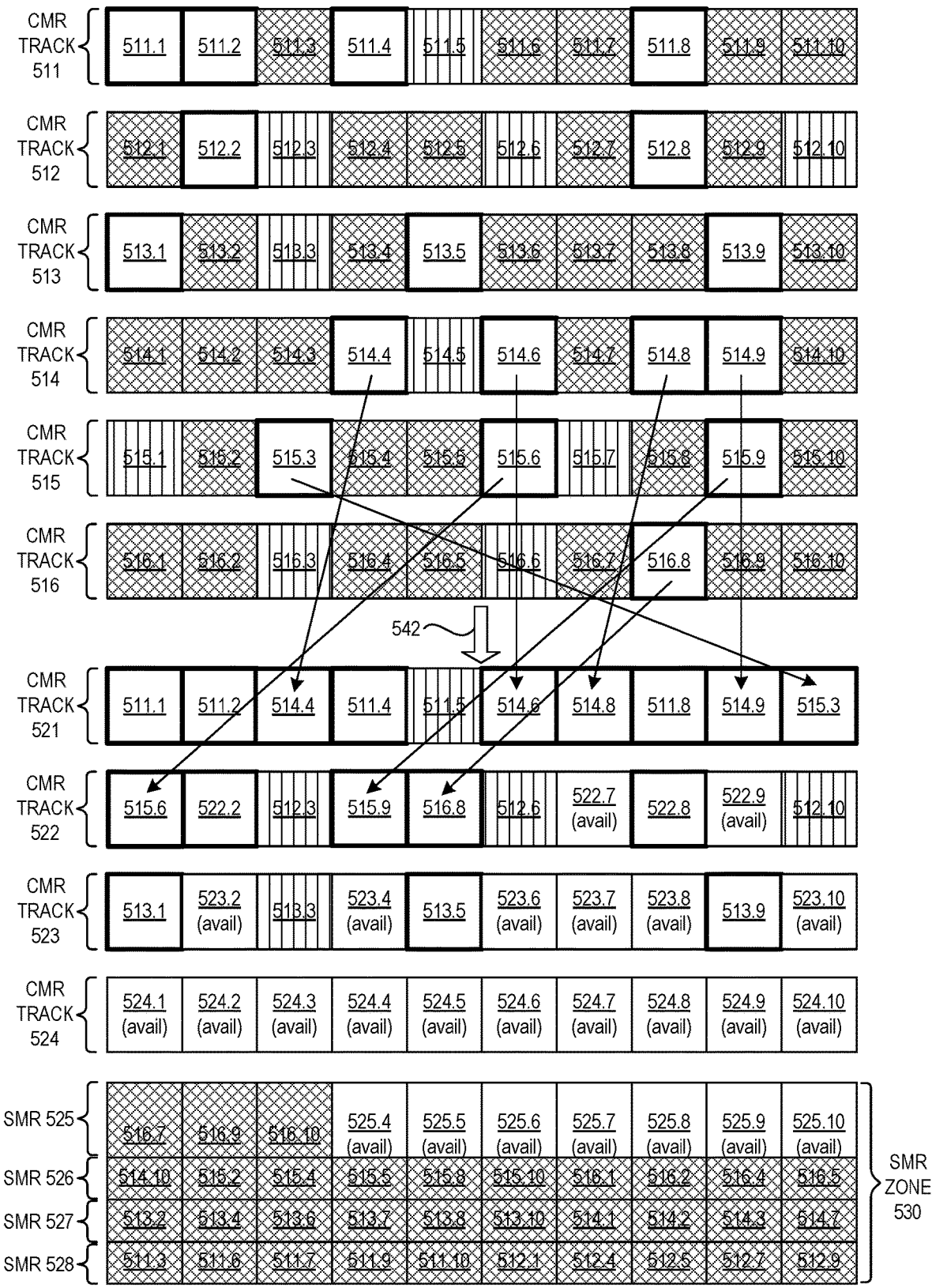
Figure 5C:
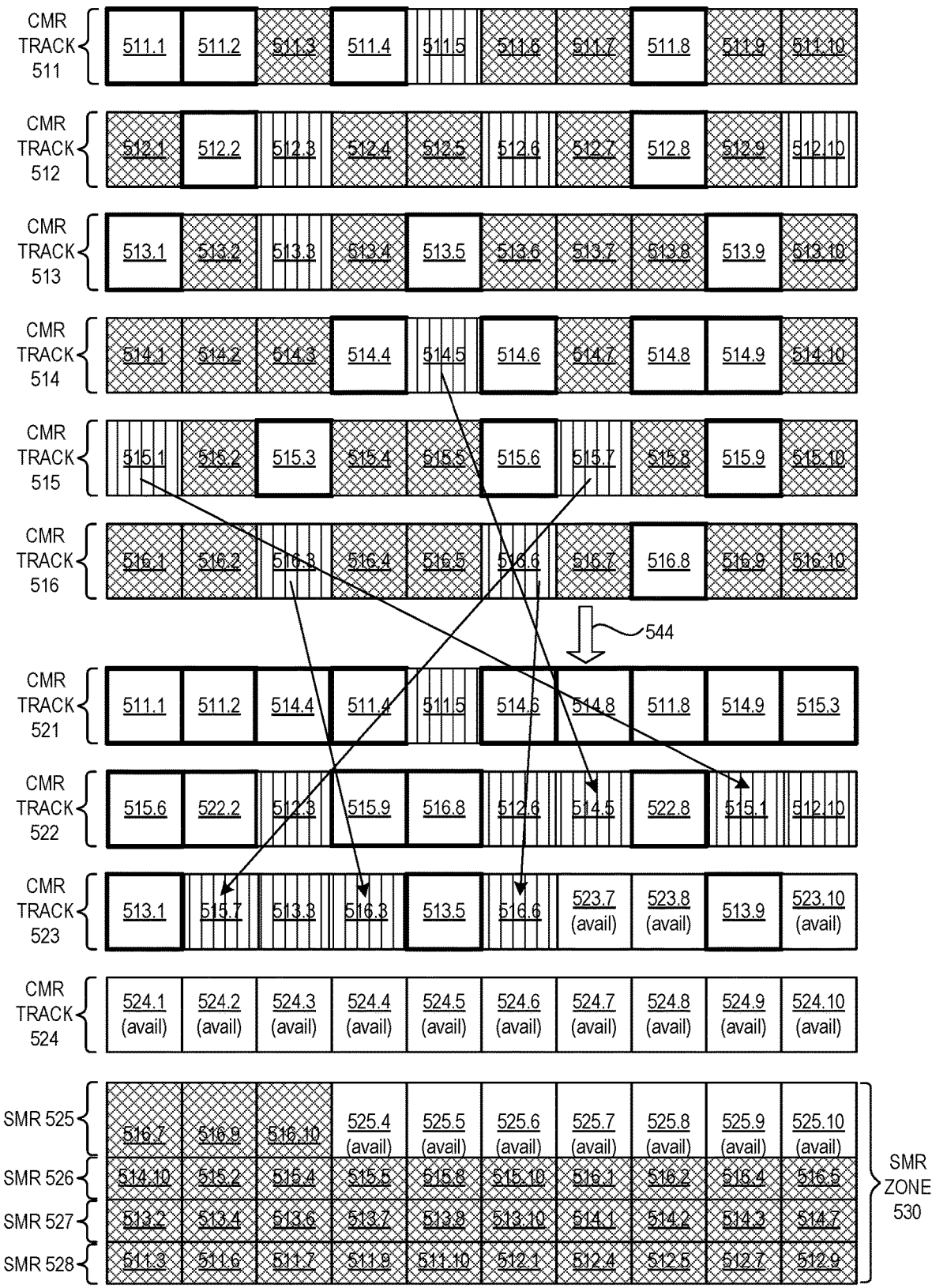

FIGS. 5A, 5B, and 5C illustrate an exemplary data placement in a hybrid HDD, including placement and classification of data, conversion of CMR-configured tracks to an SMR-configured zone, and recycling of CMR-configured tracks, in accordance with an embodiment of the present application. FIG. 5A depicts six CMR-configured tracks (CMR tracks 511, 512, 513, 514, 515, and 516), each storing data which has been classified as hot (indicated with a bold outline), warm (indicated as filled in with vertical lines), or cold (indicated as filled in with a cross-hatch pattern).

Prior to classifying the data, the system can initially place the data based on whether it is received from an archival storage product or not. For example, if the data is received from, e.g., archival storage service product 264 of FIG. 2, the system can write the data sequentially into an SMR zone (not shown). If the data is not received from an archival storage product, and is instead received from another (hot or warm storage product), e.g., warm storage service product 262 of FIG. 2), the system can write the data to a CMR-configured track (at a next available portion or by sequentially appending).

The system can subsequently classify the data, e.g., into classifications of hot, warm, or cold, based on various predetermined thresholds. CMR track 511 includes: hot data portions 511.1, 511.2, 511.4, and 511.8; a warm data portion 511.5; and cold data portions 511.3, 511.6, 511.7, 511.9, and 511.10. CMR track 512 includes: hot data portions 512.2 and 512.8; warm data portions 512.3, 512.6, and 512.10; and cold data portions 512.1, 512.4, 512.5, 512.7, and 512.9. CMR track 513 includes: hot data portions 513.1, 513.5, and 513.9; a warm data portion 513.3; and cold data portions 513.2, 513.4, 513.6, 513.7, 513.8, and 513.10. CMR track 514 includes: hot data portions 514.4, 514.6, 514.8, and 514.9; a warm data portion 514.5; and cold data portions 514.1, 514.2, 514.3, 514.7, and 514.10. CMR track 515 includes: hot data portions 515.3, 515.6, and 515.9; warm data portions 515.1 and 515.7; and cold data portions 515.2, 515.4, 515.5, 515.8, and 515.10. CMR track 516 includes: a hot data portion 516.8; warm data portions 516.3 and 515.6; and cold data portions 516.1, 516.2, 516.4, 516.5, 516.7, 516.9, and 516.10.

The system can perform a track conversion process, by dynamically adjusting a track from a CMR configuration to an SMR configuration (or an SMR zone with SMR-configured tracks) (via an operation 540). The system can detect a condition to recycle or convert a particular CMR track or tracks. The condition can be based on, e.g.: a predetermined period of time or time interval; an amount of time since a most recent recycling or conversion process; a percentage of hot, warm, or cold data in a given track at a given time; a characteristic relating to time and/or a classification of data; and a total amount of capacity available in a track; a total amount of capacity available in a hybrid HDD, control server, or E-JBOD.

In FIG. 5A, CMR track 521 corresponds to CMR track 511 at a subsequent time. That is, CMR track 511 indicates a snapshot of the data stored in CMR track 511 at a time t0, while CMR track 521 indicates a snapshot of the data stored in the same CMR track at a time t1. Similarly, CMR track 522 indicates a subsequent snapshot of CMR track 512, CMR track 523 indicates a subsequent snapshot of CMR track 513, and CMR tracks 524 indicates a subsequent snapshot of CMR track 514. SMR zone 530 (which includes SMR tracks 525, 526, 527, and 528) can indicate a subsequent snapshot corresponding to CMR tracks 515 and 516.

As part of conversion process 540, the system can copy cold data from CMR tracks 511-516 to SMR tracks 525-528 of newly configured SMR zone 530, leave hot data portions from CMR tracks 511-513 in the same place (as shown in CMR tracks 521-523), and copy out hot and warm data portions from CMR tracks 514-516 to a volatile memory (not shown). All of the thirty-three cold data portions in SMR tracks 511-516 are shown as being copied to SMR tracks 525-528 of SMR zone 530, by appending the cold data portions in a sequential manner. In some embodiments, the system can accumulate the cold data portions, and, upon detecting that the cold data portions comprise a size which exceeds a predetermined amount, the system can copy the cold data portions to an SMR zone.

The system can thus free up or make available the portions of CMR tracks 511-516 previously occupied by the cold data (as shown in CMR tracks 521-524 as "avail" (e.g., 521.3, 521.6, 521.7, 521.9, 521.10, 522.1, etc.). The system can also free up or make available the portions of CMR tracks 514-516 previously occupied by the hot or warm data (which was copied to the volatile memory), as shown in CMR track 524 as "avail" (e.g., 524.4, 524.5, 524.6, 524.8, and 524.9, which correspond to hot data portions 514.4, 514.6, 514.8, and 514.9 and warm data portion 514.5 from CMR track 514), and further as shown by SMR tracks 525-528 of SMR zone 530).

The system can subsequently copy the hot data portions from the volatile memory back to the next available portions of CMR tracks 511-513 (as described below in relation to FIG. 4B), and can further copy the warm data portions from the volatile memory back to the next available portions of CMR tracks 511-513 (as described below in relation to FIG. 4B).

As part of conversion process 540, FIG. 5B depicts a movement 542 of hot data portions from CMR tracks which are to-be-recycled to the next available portions of open CMR tracks. For example, the system can copy: hot data portion 514.4 to the next available portion of CMR track 521; hot data portion 514.6 to the next available portion of CMR track 521; hot data portion 514.8 to the next available portion of CMR track 521; hot data portion 514.9 to the next available portion of CMR track 521; hot data portion 515.3 to the next available portion of CMR track 521; hot data portion 515.6 to the next available portion of CMR track 522; hot data portion 515.9 to the next available portion of CMR track 522; and hot data portion 516.8 to the next available portion of CMR track 522.

As part of conversion process 540, FIG. 5C depicts a movement 544 of warm data portions from CMR tracks which are to-be-recycled to the next available portions of open CMR tracks. For example, the system can copy: warm data portion 514.5 to the next available portion of CMR track 522; warm data portion 515.1 to the next available portion of CMR track 522; warm data portion 515.7 to the next available portion of CMR track 523; warm data portion 516.3 to the next available portion of CMR track 523; and warm data portion 516.6 to the next available portion of CMR track 523.

The system can copy the hot and warm data portions described above in relation to FIGS. 5B and 5C first to a volatile memory, and then from the volatile memory to the open CMR tracks. In some embodiments, warm data is copied back to the open CMR tracks subsequent to the hot data being copied back to the open CMR tracks. The system can also copy back the hot and warm data from the volatile memory based on a different or predetermined priority, order, or configuration.

After conversion process 540 is complete, including movements 542 and 544 depicted in FIGS. 5B and 5C, respectively, the state of the physical memory usage in the hybrid HDD is depicted as follows: CMR tracks 521 and 522 are entirely full and have no available or free portions; CMR track 523 includes three available or free portions 523.7, 523.8, and 523.10; CMR track 524 is entirely available (e.g., includes ten available or free portions 524.1-524.10); and SMR zone 530 includes three full SMR tracks 526-528 and one SMR track 525 which includes seven available or free portions 525.4-525.10.

Thus, by using hybrid HDDs with tracks which can be dynamically configured as either CMR or SMR media, the embodiments described herein can provide a uniform storage system infrastructure by using the conversion and recycling process depicted in FIGS. 5A-5C. That is, the dynamically configurable tracks allow the system to adjust the ratio of support for different storage products on a single storage system infrastructure, which can result in an improved and more efficient usage of capacity, performance (e.g., TOPS), and Quality of Service (QoS) of the overall storage system. The system can thus provide a weighted equivalent performance (in terms of TOPS, SLAs, etc.) through the dynamic online adjustment of tracks and the classification and compaction of data, which can in turn result in efficiencies, such as a decreased and more competitive cost and an improved reliability.

Exemplary Erasure Coding Conversion from a Warm Storage Product to an Archival Storage Product Data stored in CMR HDD may use a different level of erasure coding (EC) than data stored in SMR HDD. For example, data stored in CMR tracks may be encoded based on (10,4) EC encoding, while data stored in SMR tracks may be required to be stored as encoded based on (20,4) EC encoding, e.g., in order to both save storage capacity and to meet any SLAs associated with the data. When moving data from CMR-configured tracks to an SMR zone, the system must manage the modification of the EC encoding from the CMR EC encoding scheme to the SMR EC encoding scheme. In a conventional system, achieving this EC modification may require two EC decodings (e.g., based on the (10,4) EC) and one EC encoding (e.g., based on the (20,4) EC): a first EC decoding of a first user portion; a second EC decoding of a second user portion; and a third EC encoding of the first and second user portions.

Figure 4:
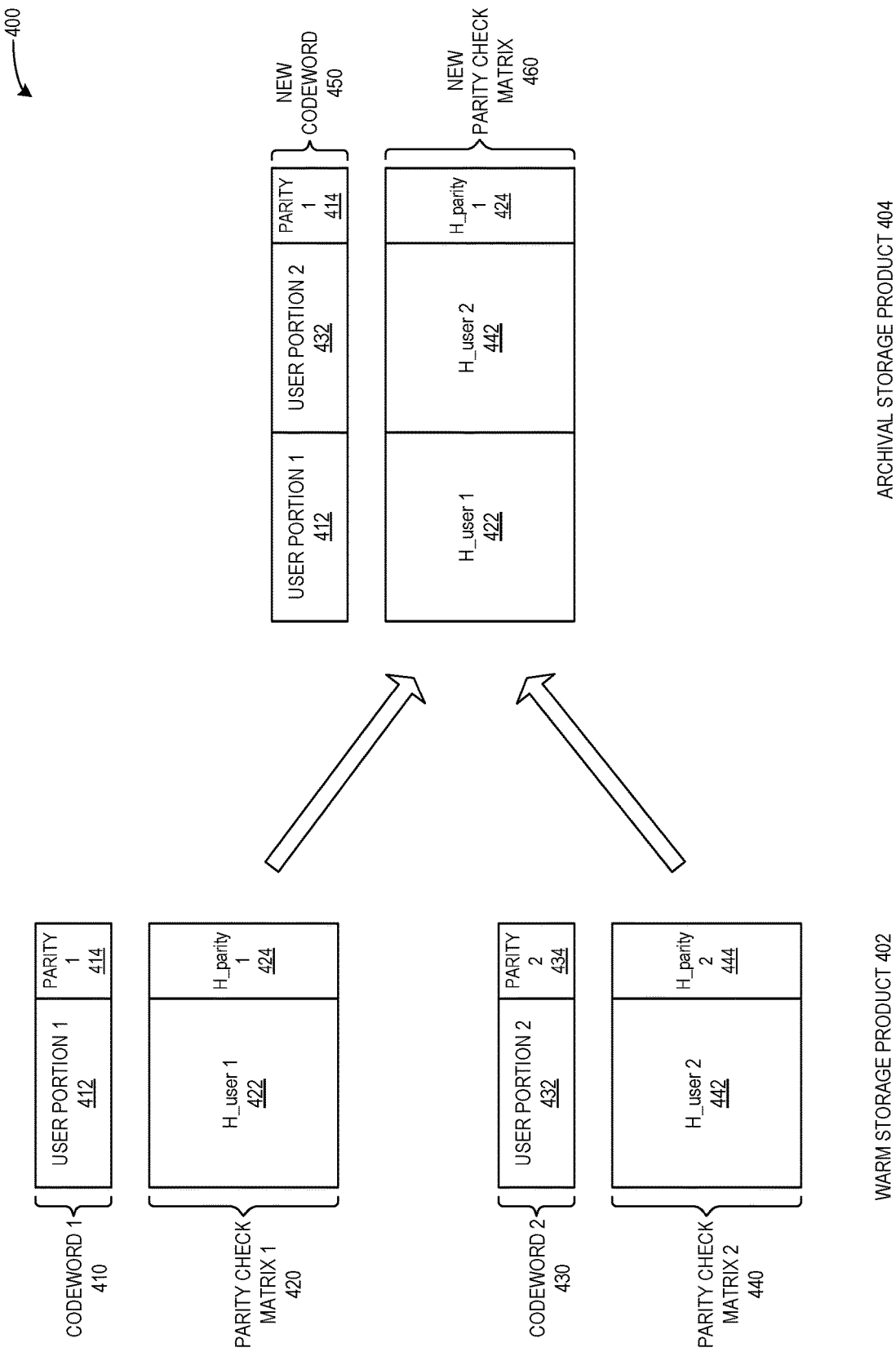
FIG. 4 depicts an exemplary erasure coding conversion from a warm storage product to an archival storage product, in accordance with an embodiment of the present application.

The embodiments described herein provide a "fast" generation of the SMR-required EC codeword, while avoiding the two EC decodings and one EC encoding required in a conventional system. FIG. 4 depicts an exemplary erasure coding conversion 400 from a warm storage product 402 (e.g., a CMR track) to an archival storage product 404 (e.g., an SMR track), in accordance with an embodiment of the present application.

The system can determine to move data from warm storage product 402 to archival storage product 404 (e.g., from a CMR-configured track to an SMR zone). Exemplary data can be stored as: a codeword 1 410, which includes a user portion 1 412 and a corresponding parity 1 414; and a codeword 2 430, which includes a user portion 2 432 and a corresponding parity 2 434. Each codeword can be generated based on a parity check matrix. For example, codeword 1 410 can be generated based on a parity check matrix 1 420, which can include a user matrix portion (H_user 1 422) and a parity matrix portion (H_parity 1 424), and codeword 2 430 can be generated based on the same parity check matrix, depicted as a parity check matrix 2 440, which can include a user matrix portion (H_user 2 442) and a parity matrix portion (H_parity 2 444). Just as the user matrix portions are the same (i.e., 422 is the same as 442), so are the user matrix portions (i.e., 424 is the same as 444).

Upon determining to move data from warm storage product 402 to archival storage product 404, the system can create a new codeword 450 by concatenating user portion 1 412 and user portion 2 432, and by generating a new parity for these concatenated user portions by, e.g., performing a bit-wise exclusive-OR operation on parity 1 414 and parity 2 434. The system can write this new codeword 450 to the SMR-zone or the SMR-configured tracks. New codeword 450 can be generated based on new parity check matrix 460, which can include two copies of the same user matrix portion (422 or 442) of parity check matrix 1 420 and parity check matrix 2 440 and one copy of the same parity matrix portion (424 or 444).

Thus, by performing the EC conversion described in FIG. 4, the system can eliminate or avoid the consumption of time and resources required to perform two EC decodings and one EC encoding for each data move. This improvement over the conventional system can result in a more efficient overall storage system.

Method for Facilitating Operation of a Storage System

Figure 6A:
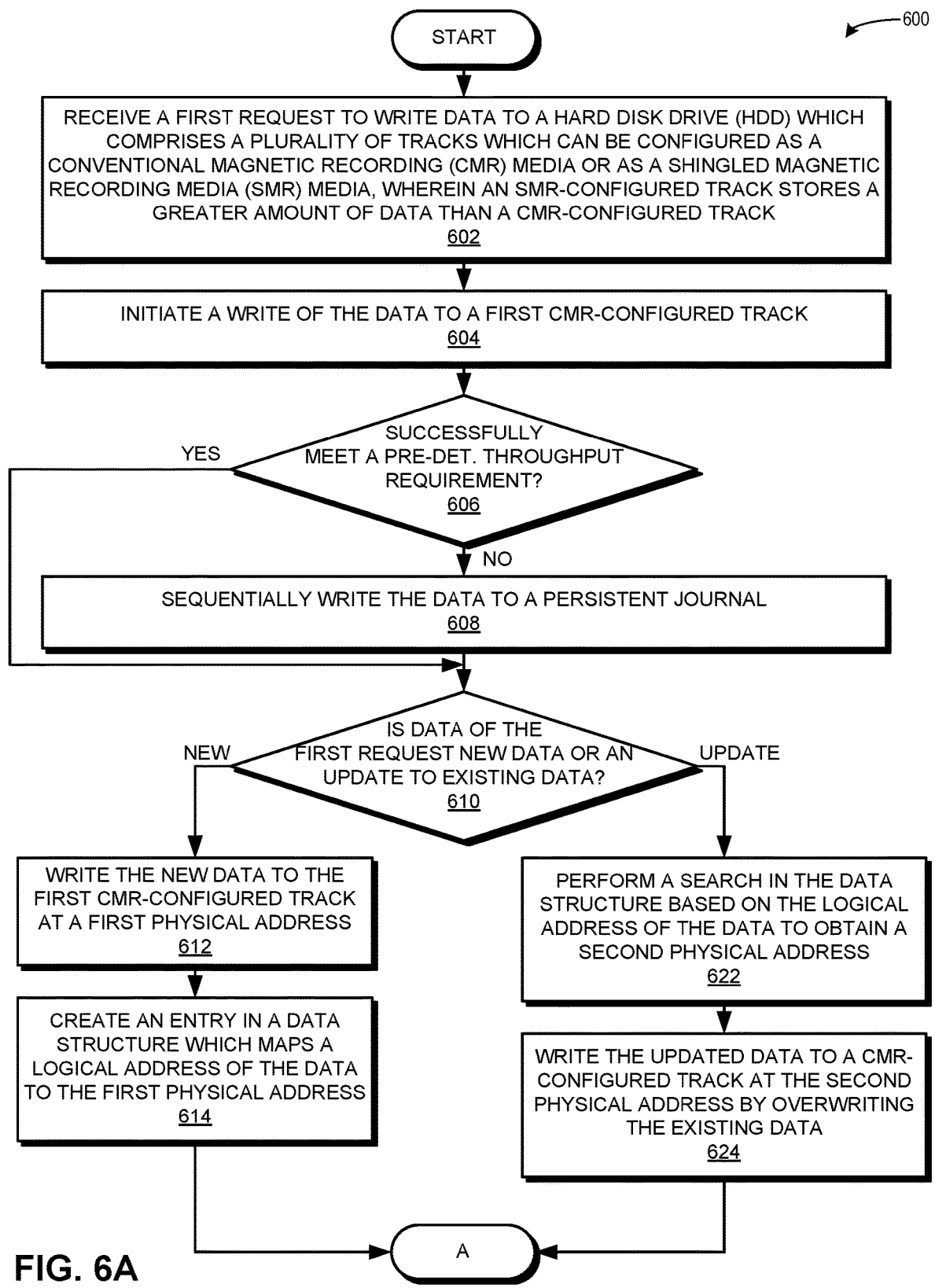
FIG. 6A presents a flowchart illustrating a method for facilitating operation of a storage system, in accordance with an embodiment of the present application.

FIG. 6A presents a flowchart 600 illustrating a method for facilitating operation of a storage system, in accordance with an embodiment of the present application. During operation, the system receives a first request to write data to a hard disk drive (HDD) which comprises a plurality of tracks which can be configured as a conventional magnetic recording (CMR) media or as a shingled magnetic recording (SMR) media, wherein an SMR-configured track stores a greater amount of data than a CMR-configured track (operation 602). The system initiates a write of the data to a first CMR-configured track (operation 604). If the system determines that the data can be successfully committed in time to meet a predetermined throughput requirement (decision 606), the operation continues at decision 610. If the system determines that the data cannot be successfully committed in time to meet the predetermined throughput requirement (decision 606), the system sequentially writes the data to a persistent journal (operation 608), and the operation continues at decision 610.

The system determines whether the data of the first request is new data or an update to existing data (decision 610). If the data is new data (decision 610), the system writes the new data to the first CMR-configured track at a first physical address (e.g., by appending the new data in a sequential manner) (operation 612) and creates an entry in a data structure which maps a logical address of the data to the first physical address (operation 614). If the data is an update to existing data (decision 610), the system performs a search in the data structure based on the logical address of the data to obtain a second physical address (operation 622) and writes the updated data to a CMR-configured track at the second physical address by overwriting the existing data (e.g., by overwriting the existing data at the second physical location) (operation 624). The operation continues at Label A of FIG. 6B.

Figure 6B:
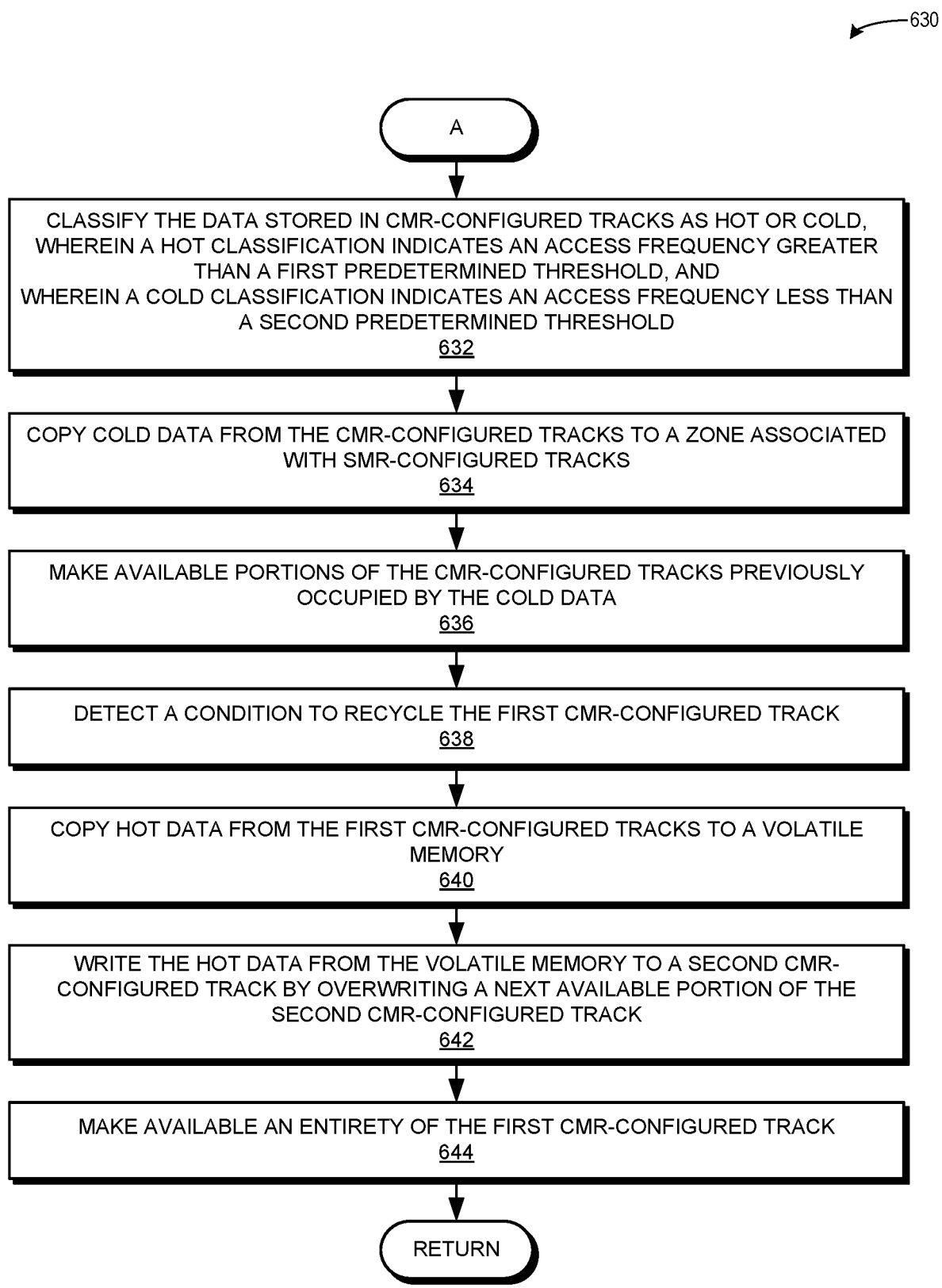
FIG. 6B presents a flowchart illustrating a method for facilitating operation of a storage system, in accordance with an embodiment of the present application.

FIG. 6B presents a flowchart 630 illustrating a method for facilitating operation of a storage system, in accordance with an embodiment of the present application. The system classifies data stored in CMR-configured tracks as hot or cold, wherein a hot classification indicates an access frequency greater than a first predetermined threshold, and wherein a cold classification indicates an access frequency less than a second predetermined threshold (operation 632). In some embodiments, the system classifies the data stored in the CMR-configured tracks as warm, wherein a warm classification indicates an access frequency less than the first predetermined threshold and greater than the second predetermined threshold. The system copies cold data from the CMR-configured tracks to a zone associated with SMR-configured tracks (operation 634). The system makes available portions of the CMR-configured tracks previously occupied by the cold data (operation 636).

The system detects a condition to recycle the first CMR-configured track (operation 638). The system copies hot data (and in some embodiments, warm data) from the first CMR-configured track to a volatile memory (operation 640). The system writes the hot data (and in some embodiments, the warm data) from the volatile memory to a second CMR-configured track by overwriting a next available portion of the second CMR-configured track (operation 642). The system makes available an entirety of the first CMR-configured track (operation 644).

The system can copy the cold data out (operations 634 and 636) in response to detecting a condition to recycle or convert a respective CMR track. Furthermore, the system can identify a CMR track to be recycled or converted. In response to detecting a condition to recycle or convert the identified CMR-configured track, the system can subsequently copy the hot (and warm) data from the identified CMR track to the volatile memory, and write that hot (and warm) data back to the second CMR-configured track (operations 640, 642, and 644).

Figure 6C:
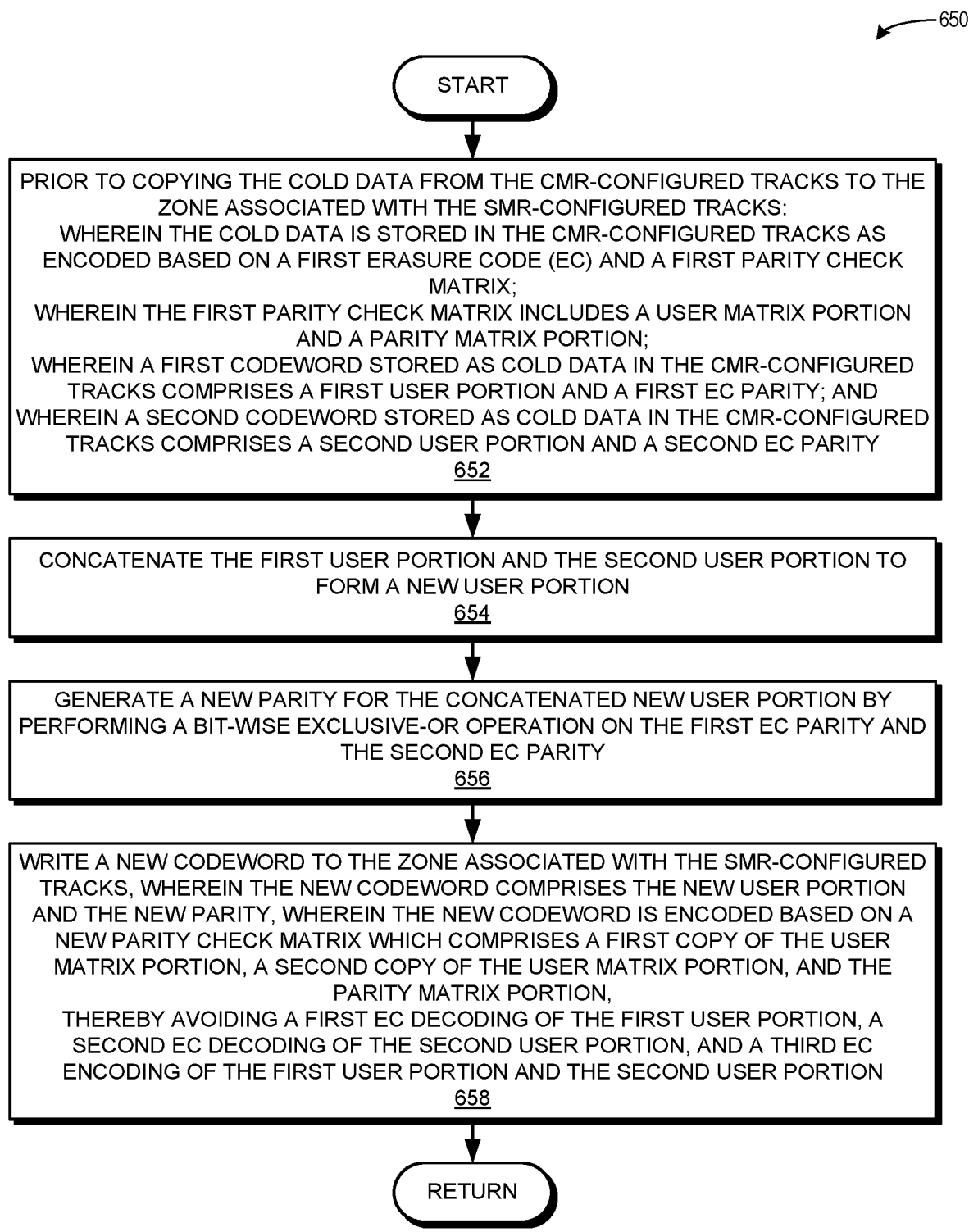
FIG. 6C presents a flowchart illustrating a method for facilitating operation of a storage system, in accordance with an embodiment of the present application.

FIG. 6C presents a flowchart 650 illustrating a method for facilitating operation of a storage system, in accordance with an embodiment of the present application. Prior to copying the cold data from the CMR-configured tracks to the zone associated with the SMR-configured tracks: the cold data is stored in the CMR-configured tracks as encoded based on a first erasure code (EC) and a first parity check matrix, the first parity check matrix includes a user matrix portion and a parity matrix portion, a first codeword stored as cold data in the CMR-configured tracks comprises a first user portion and a first EC parity, and a second codeword stored as cold data in the CMR-configured tracks comprises a second user portion and a second EC parity (operation 652).

The system copies cold data from the CMR-configured tracks to the zone associated with the SMR-configured tracks by performing at least the following operations. The system concatenates the first user portion and the second user portion to form a new user portion (operation 654). The system generates a new parity for the concatenated new user portion by performing a bitwise exclusive-OR operation on the first EC parity and the second EC parity (operation 656). The system writes a new codeword to the zone associated with the SMR-configured tracks, wherein the new codeword comprises the new user portion and the new parity, thereby avoiding a first decoding of the first user portion, a second decoding of the second user portion, and a third encoding of the first user portion and the second user portion (operation 658).

Exemplary Computer System and Apparatus

Figure 7:
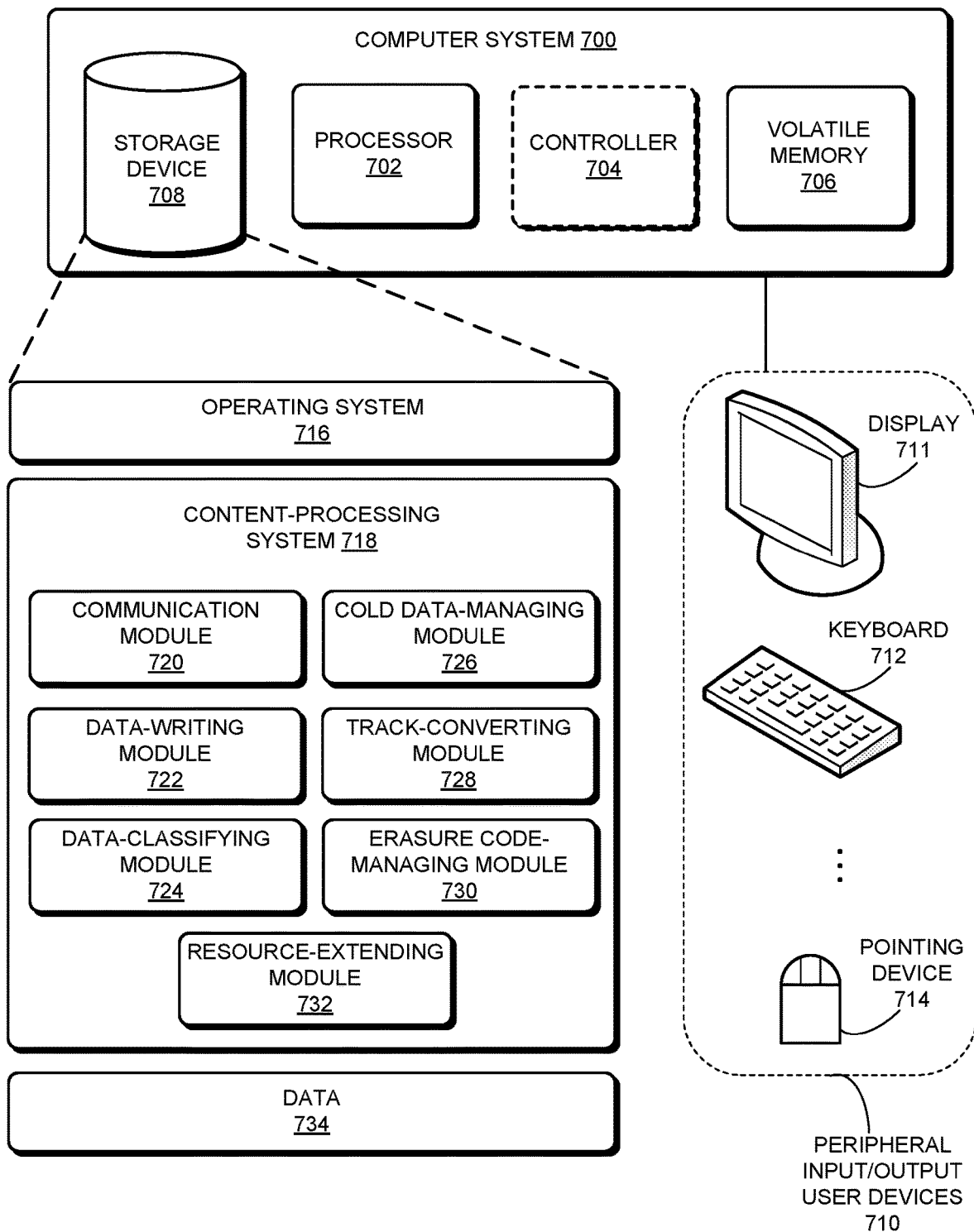
FIG. 7 illustrates an exemplary computer system that facilitates operation of a storage system, in accordance with an embodiment of the present application.

FIG. 7 illustrates an exemplary computer system that facilitates operation of a storage system, in accordance with an embodiment of the present application. Computer system 700 includes a processor 702, a volatile memory 706, and a storage device 708. In some embodiments, computer system 700 can include a controller 704 (indicated by the dashed lines). Volatile memory 706 can include, e.g., random access memory (RAM), that serves as a managed memory, and can be used to store one or more memory pools. Storage device 708 can include persistent storage which can be managed or accessed via processor 702 (or controller 704). In some embodiments, storage device 708 can correspond to hybrid HDD, as described above in relation to FIGS. 3A-3B and 5A-5C, and controller 704 may reside in a respective HDD. Furthermore, computer system 700 can be coupled to peripheral input/output (I/O) user devices 710, e.g., a display device 711, a keyboard 712, and a pointing device 714. Storage device 708 can store an operating system 716, a content-processing system 718, and data 734.

Content-processing system 718 can include instructions, which when executed by computer system 700, can cause computer system 700 or processor 702 to perform methods and/or processes described in this disclosure. Specifically, content-processing system 718 can include instructions for receiving and transmitting data packets, including data to be read or written and an input/output (I/O) request (e.g., a read request or a write request) (communication module 720).

Content-processing system 718 can further include instructions for receiving a first request to write data to a hard disk drive (HDD) which comprises a plurality of tracks which can be configured as a conventional magnetic recording (CMR) media or as a shingled magnetic recording (SMR) media, wherein an SMR-configured track stores a greater amount of data than a CMR-configured track (communication module 720). Content-processing system 718 can include instructions for writing the data to a first CMR-configured track (data-writing module 722). Content-processing system 718 can include instructions for classifying data stored in CMR-configured tracks as hot or cold, wherein a hot classification indicates an access frequency greater than a first predetermined threshold, and wherein a cold classification indicates an access frequency less than a second predetermined threshold (data-classifying module 724). Content-processing system 718 can also include instructions for copying cold data from the CMR-configured tracks to a zone associated with SMR-configured tracks (cold data-managing module 726). Content-processing system 718 can include instructions for making available portions of the CMR-configured tracks previously occupied by the cold data (track-converting module 728). Content-processing system 718 can include instructions for detecting a condition to recycle the first CMR-configured track (track-converting module 728). Content-processing system 718 can further include instructions for copying hot data from the first CMR-configured track to a volatile memory (data-writing module 722). Content-processing system 718 can include instructions for writing the hot data from the volatile memory to a second CMR-configured track by overwriting a next available portion of the second CMR-configured track (data-writing module 722). Content-processing system 718 can include instructions for making available an entirety of the first CMR-configured track (track-converting module 728).

Content-processing system 718 can additionally include instructions for concatenating a first user portion and a second user portion to form a new user portion (erasure code-managing module 730). Content-processing system 718 can include instructions for generating a new parity for the concatenated new user portion by performing a bitwise exclusive-OR operation on the first EC parity and the second EC parity (erasure code-managing module 730). Content-processing system 718 can also include instructions for writing a new codeword to the zone associated with the SMR-configured tracks, wherein the new codeword comprises the new user portion and the new parity (data-writing module 722).

Content-processing system 718 can include instructions for detecting a condition which requires adding an additional control server or an additional E-JBOD to the respective storage cluster (resource-extending module 732). Content-processing system 718 can include instructions for extending resources within the respective storage cluster by deploying the additional control server or the additional E-JBOD in the respective storage cluster (resource-extending module 732). Content-processing system 718 can also include instructions for detecting a condition which requires adding an additional storage cluster to the distributed storage system (resource-extending module 732). Content-processing system 718 can include instructions for extending resources within the distributed storage system by adding the additional storage cluster to the distributed storage system (resource-extending module 732).

Data 734 can include any data that is required as input or generated as output by the methods and/or processes described in this disclosure. Specifically, data 734 can store at least: data; a request; a read request; a write request; an input/output (I/O) request; data or metadata associated with a read request, a write request, or an I/O request; a physical address or a physical block address (PBA); a logical address or a logical block address (LBA); an indicator or identifier of a CMR-configured track, an SMR-configured track, or an SMR zone; a classification of hot, warm, or cold; a first or a second predetermined threshold; a condition to recycle or convert a track; an indicator or identifier of a volatile memory or a persistent journal; an indicator of a track or a portion of a track; a predetermined throughput requirement; an erasure code; a codeword; a user portion; a concatenation of a first and a second user portion; a codeword; a parity check matrix; a user matrix portion of a parity check matrix; a parity matrix portion of a parity check matrix; an indicator or identifier of a distributed storage system, a storage cluster, a control server, or an Ethernet-JBOD; an indicator or identifier of an HDD group; a number of HDDs in a control server or an E-JBOD; a condition which requires adding an additional control server or E-JBOD to a storage cluster; a condition which requires adding an additional storage cluster to a distributed storage system; a data structure; an entry in a data structure; an entry which maps a logical address to a physical address; and an indicator of whether data is new or an update to existing data.

Figure 8:
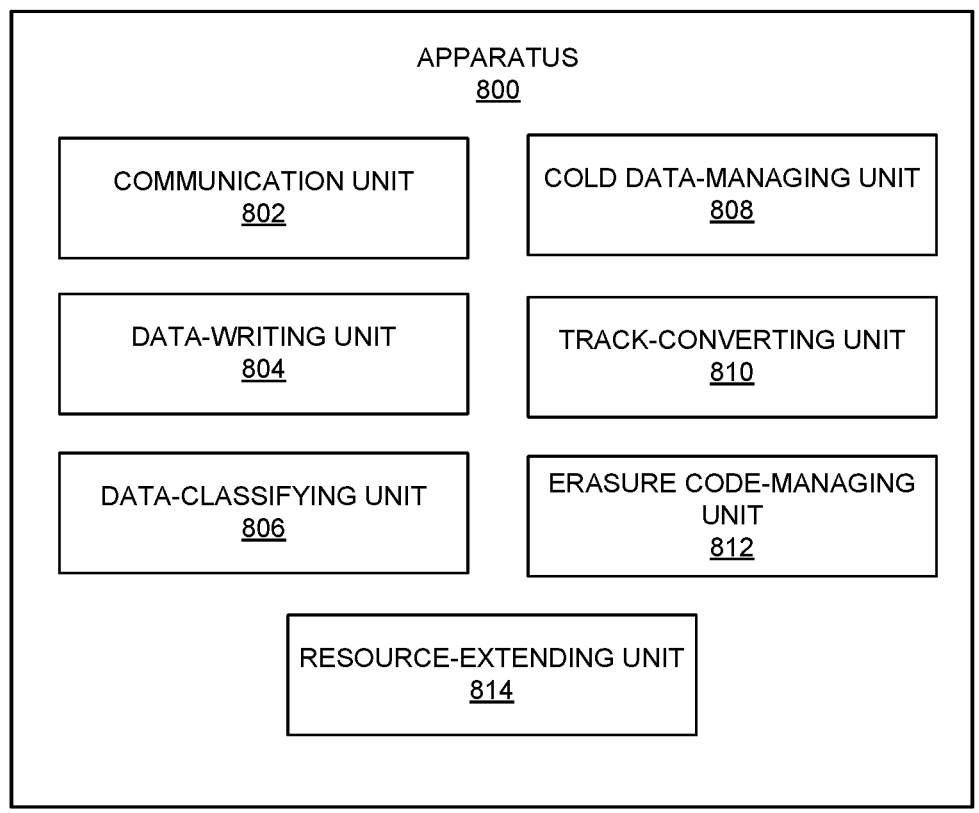
FIG. 8 illustrates an exemplary apparatus that facilitates operation of a storage system, in accordance with an embodiment of the present application.

FIG. 8 illustrates an exemplary apparatus 800 that facilitates operation of a storage system, in accordance with an embodiment of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Furthermore, apparatus 800 may be integrated in a computer system, or realized as a separate device or devices capable of communicating with other computer systems and/or devices. Apparatus 800 can include at least one hard disk drive.

Apparatus 800 can comprise modules or units 802-814 which are configured to perform functions or operations similar to modules 720-732 of computer system 700 of FIG. 7, including: a communication unit 802; a data-writing unit 804; a data-classifying unit 806; a cold data-managing unit 808; a track-converting unit 810; an erasure code-managing unit 812; and a resource-extending unit 814.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
receiving a first request to write data to a hard disk drive (HDD) which comprises a plurality of tracks which can be configured as a conventional magnetic recording (CMR) media or as a shingled magnetic recording (SMR) media, wherein an SMR-configured track stores a greater amount of data than a CMR-configured track;
writing the data to a first CMR-configured track;
classifying data stored in CMR-configured tracks as hot or cold, wherein a hot classification indicates an access frequency greater than a first predetermined threshold, and wherein a cold classification indicates an access frequency less than a second predetermined threshold;
copying cold data from the CMR-configured tracks to a zone associated with SMR-configured tracks; and
making available portions of the CMR-configured tracks previously occupied by the cold data.

2. The method of claim 1, further comprising:
detecting a condition to recycle the first CMR-configured track;

copying hot data from the first CMR-configured track to a volatile memory;

writing the hot data from the volatile memory to a second CMR-configured track by overwriting a next available portion of the second CMR-configured track; and making available an entirety of the first CMR-configured track.

3. The method of claim 2, further comprising:

classifying the data stored in the CMR-configured tracks as warm, wherein a warm classification indicates an access frequency less than the first predetermined threshold and greater than the second predetermined threshold;

wherein in response to detecting the condition to recycle the first CMR-configured track, the method further comprises:

copying the warm data from the first CMR-configured track to the volatile memory; and subsequent to writing the hot data from the volatile memory to the second CMR-configured track, writing the warm data from the volatile memory to the second CMR-configured track or a third CMR-configured track with available space by overwriting the next available portion of the second or the third CMR-configured track.

4. The method of claim 1, wherein prior to writing the data to the first CMR-configured track, the method further comprises:

in response to determining that the data cannot be successfully committed in time to meet a predetermined throughput requirement:

sequentially writing the data into a persistent journal; and writing the data from the persistent journal to the first or another CMR-configured track.

5. The method of claim 1, wherein the cold data stored in the CMR-configured tracks is encoded based on a first erasure code (EC) and a first parity check matrix, wherein the first parity check matrix includes a user matrix portion and a parity matrix portion, wherein a first codeword stored as cold data in the CMR-configured tracks comprises a first user portion and a first EC parity, wherein a second codeword stored as cold data in the CMR-configured tracks comprises a second user portion and a second EC parity, and wherein copying cold data from the CMR-configured tracks to the zone associated with the SMR-configured tracks comprises:

concatenating the first user portion and the second user portion to form a new user portion;

generating a new parity for the concatenated new user portion by performing a bitwise exclusive-OR operation on the first EC parity and the second EC parity; and writing a new codeword to the zone associated with the SMR-configured tracks, wherein the new codeword comprises the new user portion and the new parity, thereby avoiding a first decoding of the first user portion, a second decoding of the second user portion, and a third encoding of the first user portion and the second user portion.

6. The method of claim 5, wherein the new codeword is encoded based on a new parity check matrix which comprises a first copy of the user matrix portion, a second copy of the user matrix portion, and the parity matrix portion.

7. The method of claim 1, wherein a distributed storage system comprises a plurality of storage clusters, wherein a respective storage cluster does not include any reserved capacity and does include a plurality of control servers and a plurality of Ethernet just a bunch of disks (E-JBODs), wherein a control server includes a persistent journal and a first number of hard disk drives with tracks configurable as CMR or SMR media, wherein an E-JBOD includes a custom network interface card (NIC) and a plurality of HDD groups, wherein an HDD group comprises a plurality of hard disk drives (HDDs) with tracks configurable as CMR or SMR media, and wherein a total number of HDDs of the E-JBOD is greater than the first number of HDDs in the control server.

8. The method of claim 7, further comprising:

detecting a condition which requires adding an additional control server or an additional E-JBOD to the respective storage cluster;

extending resources within the respective storage cluster by deploying the additional control server or the additional E-JBOD in the respective storage cluster;

detecting a condition which requires adding an additional storage cluster to the distributed storage system; and extending resources within the distributed storage system by adding the additional storage cluster to the distributed storage system.

9. The method of claim 1, further comprising:

receiving a second request to read data from the hard disk drive (HDD);

performing a search in a data structure based on a logical address for the requested data to obtain a corresponding physical address; and reading the requested data from the HDD based on the obtained physical address.

10. The method of claim 1, wherein prior to writing the data to the first CMR-configured track, the method further comprises:

determining whether the data of the first request is new data or an update to existing data;

in response to determining that the data is new data:

writing the new data to the first CMR-configured track at a first physical address; and creating an entry in a data structure which maps a logical address of the data to the first physical address; and in response to determining that the data is updated data:

performing a search in the data structure based on the logical address of the data to obtain a second physical address;

writing the updated data to a CMR-configured track at the second physical address.

11. A computer system, comprising:

a processor; and a memory coupled to the processor and storing instructions which, when executed by the processor, cause the processor to perform a method, the method comprising:

receiving a first request to write data to a hard disk drive (HDD) which comprises a plurality of tracks which can be configured as a conventional magnetic recording (CMR) media or as a shingled magnetic recording (SMR) media, wherein an SMR-configured track stores a greater amount of data than a CMR-configured track;

writing the data to a first CMR-configured track;

classifying data stored in CMR-configured tracks as hot or cold, wherein a hot classification indicates an access frequency greater than a first predetermined threshold, and wherein a cold classification indicates an access frequency less than a second predetermined threshold;

copying cold data from the CMR-configured tracks to a zone associated with SMR-configured tracks; and making available portions of the CMR-configured tracks previously occupied by the cold data.

12. The computer system of claim 11, wherein the method further comprises:

detecting a condition to recycle the first CMR-configured track;

copying hot data from the first CMR-configured track to a volatile memory;

writing the hot data from the volatile memory to a second CMR-configured track by overwriting a next available portion of the second CMR-configured track; and making available an entirety of the first CMR-configured track.

13. The computer system of claim 12, wherein the method further comprises:

classifying the data stored in the CMR-configured tracks as warm, wherein a warm classification indicates an access frequency less than the first predetermined threshold and greater than the second predetermined threshold;

wherein in response to detecting the condition to recycle the first CMR-configured track, the method further comprises:

copying the warm data from the first CMR-configured track to the volatile memory; and subsequent to writing the hot data from the volatile memory to the second CMR-configured track, writing the warm data from the volatile memory to the second CMR-configured track or a third CMR-configured track with available space by overwriting the next available portion of the second or the third CMR-configured track.

14. The computer system of claim 11, wherein prior to writing the data to the first CMR-configured track, the method further comprises:

in response to determining that the data cannot be successfully committed in time to meet a predetermined throughput requirement:

sequentially writing the data into a persistent journal; and writing the data from the persistent journal to the first or another CMR-configured track.

15. The computer system of claim 11, wherein the cold data stored in the CMR-configured tracks is encoded based on a first erasure code (EC) and a first parity check matrix, wherein the first parity check matrix includes a user matrix portion and a parity matrix portion, wherein a first codeword stored as cold data in the CMR-configured tracks comprises a first user portion and a first EC parity, wherein a second codeword stored as cold data in the CMR-configured tracks comprises a second user portion and a second EC parity, and wherein copying cold data from the CMR-configured tracks to the zone associated with the SMR-configured tracks comprises:

concatenating the first user portion and the second user portion to form a new user portion;

generating a new parity for the concatenated new user portion by performing a bitwise exclusive-OR operation on the first EC parity and the second EC parity; and writing a new codeword to the zone associated with the SMR-configured tracks, wherein the new codeword comprises the new user portion and the new parity, thereby avoiding a first decoding of the first user portion, a second decoding of the second user portion, and a third encoding of the first user portion and the second user portion.

16. The computer system of claim 11, wherein the computer system comprises a plurality of storage clusters, wherein a respective storage cluster does not include any reserved capacity and does include a plurality of control servers and a plurality of Ethernet just a bunch of disks (E-JBODs), wherein a control server includes a persistent journal and a first number of hard disk drives with tracks configurable as CMR or SMR media, wherein an E-JBOD includes a custom network interface card (NIC) and a plurality of HDD groups, wherein an HDD group comprises a plurality of hard disk drives (HDDs) with tracks configurable as CMR or SMR media, and wherein a total number of HDDs of the E-JBOD is greater than the first number of HDDs in the control server.

17. The computer system of claim 16, wherein the method further comprises:

detecting a condition which requires adding an additional control server or an additional E-JBOD to the respective storage cluster;

extending resources within the respective storage cluster by deploying the additional control server or the additional E-JBOD in the respective storage cluster;

detecting a condition which requires adding an additional storage cluster to the distributed storage system; and extending resources within the distributed storage system by adding the additional storage cluster to the distributed storage system.

18. The computer system of claim 11, wherein the method further comprises:

receiving a second request to read data from the hard disk drive (HDD);

performing a search in a data structure based on a logical address for the requested data to obtain a corresponding physical address; and reading the requested data from the HDD based on the obtained physical address.

19. The computer system of claim 11, wherein prior to writing the data to the first CMR-configured track, the method further comprises:

determining whether the data of the first request is new data or an update to existing data;

in response to determining that the data is new data:

writing the new data to the first CMR-configured track at a first physical address; and creating an entry in a data structure which maps a logical address of the data to the first physical address; and in response to determining that the data is updated data:

performing a search in the data structure based on the logical address of the data to obtain a second physical address;

writing the updated data to a CMR-configured track at the second physical address.

20. An apparatus, comprising:

a non-volatile memory of a hard disk drive, wherein the hard disk drive comprises a plurality of tracks which can be configured as a conventional magnetic recording (CMR) media or as a shingled magnetic recording (SMR) media, wherein an SMR-configured track stores a greater amount of data than a CMR-configured track; and a controller configured to:

receive a first request to write data to the hard disk drive;

write the data to a first CMR-configured track;

classify data stored in CMR-configured tracks as hot or cold, wherein a hot classification indicates an access frequency greater than a first predetermined threshold, and wherein a cold classification indicates an access frequency less than a second predetermined threshold;

copy cold data from the CMR-configured tracks to a zone associated with SMR-configured tracks; and make available portions of the CMR-configured tracks previously occupied by the cold data.

* * * * *